United States Patent
Jung et al.

(10) Patent No.: US 11,601,848 B2
(45) Date of Patent: Mar. 7, 2023

(54) METHOD AND APPARATUS FOR OFFLOADING DATA IN WIRELESS COMMUNICATION SYSTEM

(71) Applicant: Samsung Electronics Co., Ltd., Suwon-si (KR)

(72) Inventors: Byounghoon Jung, Suwon-si (KR); Byungju Lee, Suwon-si (KR); Jungsoo Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 72 days.

(21) Appl. No.: 17/106,757

(22) Filed: Nov. 30, 2020

(65) Prior Publication Data
US 2021/0168655 A1    Jun. 3, 2021

(30) Foreign Application Priority Data

Nov. 29, 2019   (KR) ........................ 10-2019-0157119

(51) Int. Cl.
*H04W 28/08*   (2009.01)
*H04W 28/02*   (2009.01)
*H04L 5/00*   (2006.01)

(52) U.S. Cl.
CPC ....... *H04W 28/0933* (2020.05); *H04L 5/0055* (2013.01); *H04W 28/0268* (2013.01); *H04W 28/0967* (2020.05)

(58) Field of Classification Search
CPC ......... H04W 28/0933; H04W 28/0967; H04W 28/0268; H04L 5/0055
See application file for complete search history.

(56) References Cited

U.S. PATENT DOCUMENTS 10,320,929 B1 *   6/2019   Johnson .............. H04L 67/1097
11,202,193 B2 *   12/2021   Panchai ................ H04W 40/12
(Continued)

FOREIGN PATENT DOCUMENTS

CN   110 096 362 A   8/2019
KR   10-2019-0096052 A   8/2019
(Continued)

OTHER PUBLICATIONS

International Search Report dated Mar. 5, 2021, issued in International Application No. PCT/KR2020/017330.
(Continued)

*Primary Examiner* — Christopher M Crutchfield
*Assistant Examiner* — Tito Q Pham
(74) *Attorney, Agent, or Firm* — Jefferson IP Law, LLP

(57) ABSTRACT

A method and an apparatus for offloading data in a wireless communication system are provided. The method performed by a user equipment (UE) of offloading data includes determining a server for processing at least some of the data, receiving, from the server, a list regarding splitting points at which the data is splittable, determining, based on the list, at least one of the splitting points as an offloading point, transmitting, to the server, information about the offloading point and information about requirements for offloading data corresponding to the offloading point, receiving, from the server, a response as to whether the offloading data is capable of being processed, and determining whether the offloading data is to be processed, based on the response.

19 Claims, 20 Drawing Sheets

(56) References Cited

U.S. PATENT DOCUMENTS

| | | | |
|---|---|---|---|
| 11,349,764 B2* | 5/2022 | Hande | H04W 72/087 |
| 2003/0169739 A1* | 9/2003 | Lavigne | H04L 47/10 |
| | | | 370/468 |
| 2011/0300852 A1* | 12/2011 | Krishnaswamy | H04W 4/02 |
| | | | 455/422.1 |
| 2013/0041985 A1* | 2/2013 | Christiansen | G06F 21/6218 |
| | | | 709/219 |
| 2014/0025828 A1* | 1/2014 | Li | H04L 47/70 |
| | | | 709/226 |
| 2014/0344447 A1* | 11/2014 | Cho | H04L 67/025 |
| | | | 709/224 |
| 2018/0183855 A1 | 6/2018 | Sabella et al. | |
| 2018/0310150 A1* | 10/2018 | Cuevas Ramirez | G06F 8/61 |
| 2019/0020657 A1* | 1/2019 | Egner | H04W 12/009 |
| 2019/0132709 A1* | 5/2019 | Graefe | G08G 1/096716 |
| 2019/0342373 A1* | 11/2019 | Li | H04L 67/10 |
| 2020/0204977 A1* | 6/2020 | Panchal | H04W 72/087 |
| 2020/0267518 A1* | 8/2020 | Sabella | H04W 12/06 |
| 2021/0105624 A1* | 4/2021 | Sardesai | H04W 12/088 |
| 2021/0112438 A1* | 4/2021 | Soloway | H04L 65/80 |
| 2021/0144515 A1* | 5/2021 | Chang | G06F 9/5072 |
| 2021/0289390 A1* | 9/2021 | Zhou | H04W 28/0263 |

FOREIGN PATENT DOCUMENTS

| | | |
|---|---|---|
| WO | 2011/153504 A1 | 12/2011 |
| WO | 2017/112866 A1 | 6/2017 |

OTHER PUBLICATIONS

Kim Kitae et al: "Prediction Based Sub?Task Offloading in Mobile Edge Computing", 2019 International Conference on Information Networking (ICOIN), IEEE, (Jan. 9, 2019), pp. 448-452, XP033551534.
European Office Action dated Dec. 9, 2022, issued in European Application No. 20891834.2.

* cited by examiner

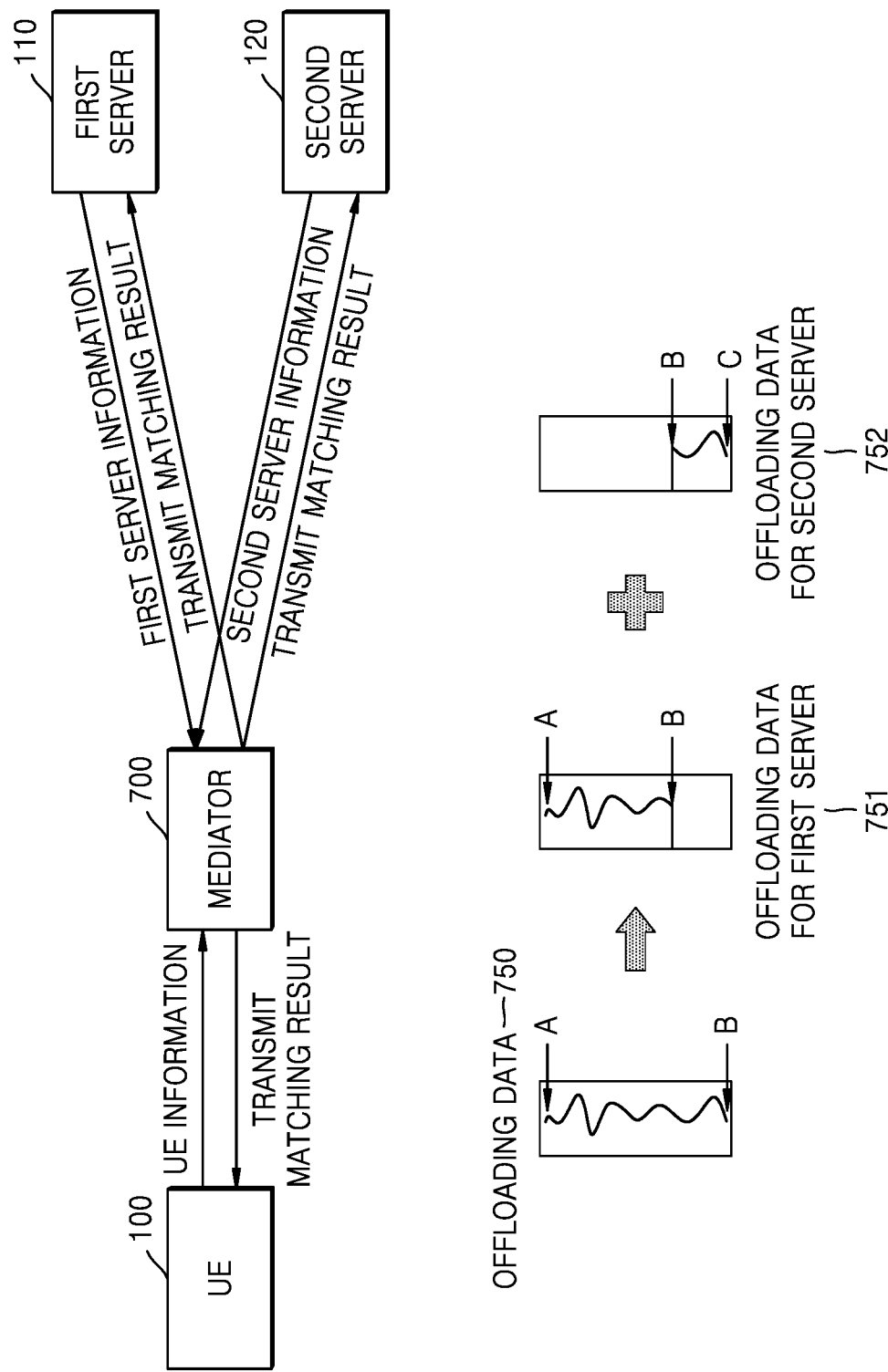

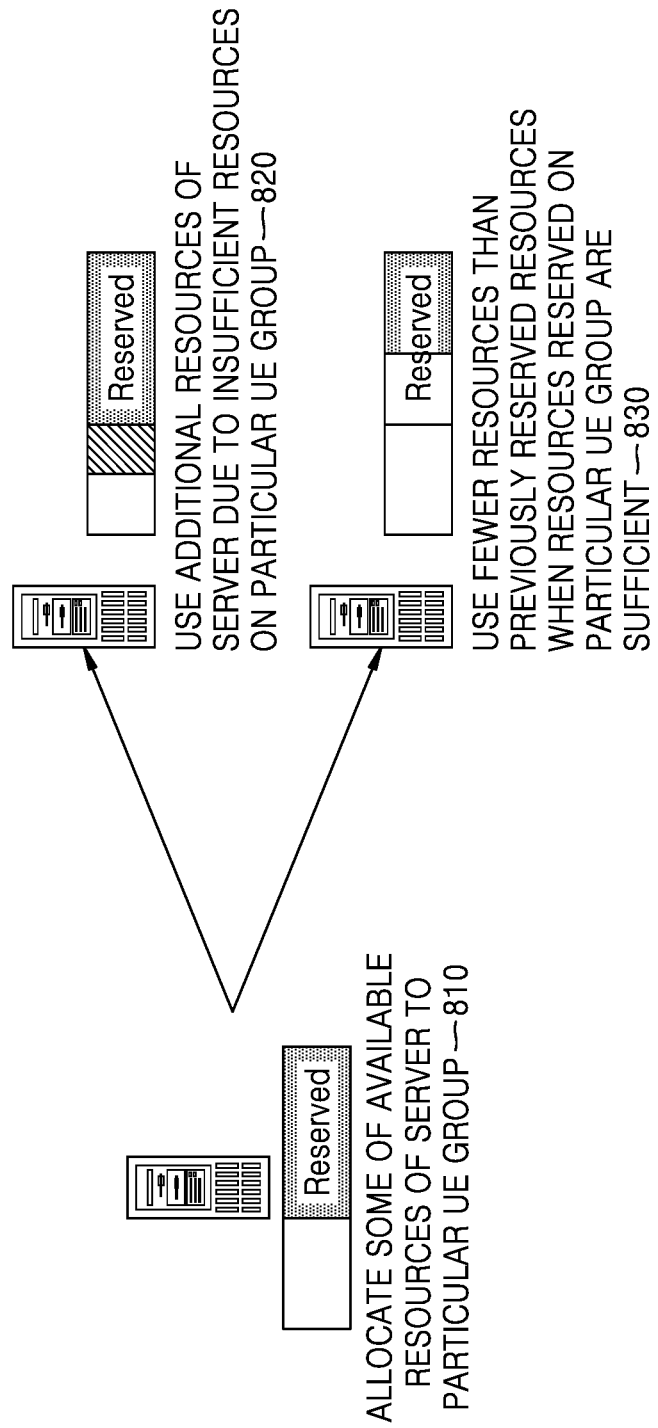

FIG. 10

| TYPE OF REQUIREMENTS 1010 | IN CASE WHERE REQUIREMENTS FOR OFFLOADING DATA ARE MANDATORY REQUIREMENTS 1011 | WHEN SERVER IS NOT CAPABLE OF ACCEPTING REQUIREMENTS, RETURN NACK, OR IN CASE OF NO RESPONSE, RESPONSE IS CONSIDERED NACK —1012 |
|---|---|---|
| | | WHEN SERVER IS NOT CAPABLE OF ACCEPTING REQUIREMENTS, RETURN NACK + CHANGED REQUIREMENTS —1013 |
| | | WHEN SERVER IS CAPABLE OF ACCEPTING REQUIREMENTS, RETURN ACK, OR IN CASE OF NO RESPONSE, RESPONSE IS CONSIDERED ACK —1014 |
| | IN CASE WHERE REQUIREMENTS FOR OFFLOADING DATA ARE RECOMMENDED REQUIREMENTS 1015 | EVEN WHEN SERVER IS NOT CAPABLE OF ACCEPTING REQUIREMENTS, NOT RETURN NACK —1016 |
| | | WHEN SERVER IS CAPABLE OF ACCEPTING REQUIREMENTS, RETURN ACK, OR IN CASE OF NO RESPONSE, RESPONSE IS CONSIDERED ACK —1017 |
| DETAILS OF REQUIREMENTS 1020 | QUALITY OF SERVICE(QOS) INFORMATION, CAPACITY INFORMATION, PROCESSING TIME INFORMATION | |

| PROCESSING TIME INFORMATION —1021 | UE ESTIMATED TIME > SERVER ESTIMATED TIME | TRANSMIT ACK |
| --- | --- | --- |
| | | TRANSMIT ACK AND CHANGE REQUEST INFORMATION |
| | SERVER ESTIMATED TIME > UE ESTIMATED TIME | TRANSMIT NACK |
| | | TRANSMIT NACK AND CHANGE REQUEST INFORMATION |

METHOD AND APPARATUS FOR OFFLOADING DATA IN WIRELESS COMMUNICATION SYSTEM

CROSS-REFERENCE TO RELATED APPLICATION(S)

This application is based on and claims priority under 35 U.S.C. § 119(a) of a Korean patent application number 10-2019-0157119, filed on Nov. 29, 2019, in the Korean Intellectual Property Office, the disclosure of which is incorporated by reference herein in its entirety.

BACKGROUND

1. Field

The disclosure relates to a method and an apparatus for offloading data in a wireless communication system. More particularly, the disclosure relates to a method and an apparatus for offloading data so as to satisfy preset requirements.

2. Description of Related Art

Considering the development of wireless communication from generation to generation, the technologies have been developed mainly for services targeting humans, such as voice calls, multimedia services, and data services. Following the commercialization of 5G (5th-generation) communication systems, it is expected that the number of connected devices will exponentially grow. Increasingly, these will be connected to communication networks. Examples of connected things may include vehicles, robots, drones, home appliances, displays, smart sensors connected to various infrastructures, construction machines, and factory equipment. Mobile devices are expected to evolve in various form-factors, such as augmented reality glasses, virtual reality headsets, and hologram devices. In order to provide various services by connecting hundreds of billions of devices and things in the 6G (6th-generation) era, there have been ongoing efforts to develop improved 6G communication systems. For these reasons, 6G communication systems are referred to as beyond-5G systems.

6G communication systems, which are expected to be commercialized around 2030, will have a peak data rate of tera (1,000 giga)-level bps and a radio latency less than 100 μsec, and thus will be 50 times as fast as 5G communication systems and have the 1/10 radio latency thereof.

In order to accomplish such a high data rate and an ultra-low latency, it has been considered to implement 6G communication systems in a terahertz band (for example, 95 GHz to 3 THz bands). It is expected that, due to more severe path loss and atmospheric absorption in the terahertz bands than those in mmWave bands introduced in 5G, technologies capable of securing the signal transmission distance (that is, coverage) will become more crucial. It is necessary to develop, as major technologies for securing the coverage, radio frequency (RF) elements, antennas, novel waveforms having a better coverage than orthogonal frequency division multiplexing (OFDM), beamforming and massive multiple input multiple output (MIMO), full dimensional MIMO (FD-MIMO), array antennas, and multiantenna transmission technologies such as large-scale antennas. In addition, there has been ongoing discussion on new technologies for improving the coverage of terahertz-band signals, such as metamaterial-based lenses and antennas, orbital angular momentum (OAM), and reconfigurable intelligent surface (RIS).

Moreover, in order to improve the spectral efficiency and the overall network performances, the following technologies have been developed for 6G communication systems: a full-duplex technology for enabling an uplink transmission and a downlink transmission to simultaneously use the same frequency resource at the same time; a network technology for utilizing satellites, high-altitude platform stations (HAPS), and the like in an integrated manner; an improved network structure for supporting mobile base stations and the like and enabling network operation optimization and automation and the like; a dynamic spectrum sharing technology via collison avoidance based on a prediction of spectrum usage; an use of artificial intelligence (AI) in wireless communication for improvement of overall network operation by utilizing AI from a designing phase for developing 6G and internalizing end-to-end AI support functions; and a next-generation distributed computing technology for overcoming the limit of UE computing ability through reachable super-high-performance communication and computing resources (such as mobile edge computing (MEC), clouds, and the like) over the network. In addition, through designing new protocols to be used in 6G communication systems, developing mechanisms for implementing a hardware-based security environment and safe use of data, and developing technologies for maintaining privacy, attempts to strengthen the connectivity between devices, optimize the network, promote softwarization of network entities, and increase the openness of wireless communications are continuing.

It is expected that research and development of 6G communication systems in hyper-connectivity, including person to machine (P2M) as well as machine to machine (M2M), will allow the next hyper-connected experience. Particularly, it is expected that services such as truly immersive extended reality (XR), high-fidelity mobile hologram, and digital replica could be provided through 6G communication systems. In addition, services such as remote surgery for security and reliability enhancement, industrial automation, and emergency response will be provided through the 6G communication system such that the technologies could be applied in various fields such as industry, medical care, automobiles, and home appliances.

With advancements in smart devices, the amount of data being processed by smart devices has increased, and types of data processed by the smart devices have diversified. In other words, as types of smart devices have diversified and their performance has improved, the amount of data to be processed has increased, and a required level of data processing has been heightened.

Accordingly, an offloading technology is required which allows a part of data to be processed by a smart device to be processed by a server instead of the smart device. When it is more efficient to transmit data to a server for processing than to process the data in a smart device, the offloading technology refers to a technology that allows the smart device to transmit some of its data to the server for processing and receive a result of the processing from the server.

Moreover, when a plurality of smart devices offload data, each of the smart devices may offload a different type of data, and thus, different requirements need to be satisfied. Furthermore, as data is offloaded from multiple smart devices, there is a need for an offloading technology that takes into account real-time changing channel conditions and server environment.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method and an apparatus for offloading data in a wireless communication system.

Another aspect of the disclosure is to provide a method and an apparatus for offloading data so as to satisfy preset requirements.

Another aspect of the disclosure is to provide a method and an apparatus for offloading data according to changing channel conditions and server environment.

Additional aspects will be set forth in part in the description which follows and, in part, will be apparent from the description, or may be learned by practice of the presented embodiments.

In accordance with an aspect of the disclosure, a method performed by a user equipment (UE) of offloading data is provided. The method includes determining a server for processing at least some of the data, receiving a list regarding splitting points at which the data is splittable from the server, determining, based on the list, at least one of the splitting points as an offloading point, transmitting, to the server, information about the offloading point and information about requirements for offloading data corresponding to the offloading point, receiving, from the server, a response as to whether the offloading data is capable of being processed, and determining whether the offloading data is to be processed, based on the response.

The information about the requirements may include at least one of quality of service (QoS) information, latency information, processing time information, or capacity information that needs to be satisfied when the offloading data is processed by the server.

The response as to whether the offloading data is capable of being processed may include when the offloading data is capable of being processed to satisfy the requirements, an acknowledgement (ACK), and when the offloading data is not capable of being processed to satisfy the requirements, a negative-ACK (NACK) when the requirements are mandatory requirements and change request information when the requirements are not the mandatory requirements.

The method may further include estimating a time required for the server to process the offloading data, and the requirements include a condition that a time calculated by the server as a time required to process the offloading data is less than the estimated time.

The determining of whether the offloading data is to be processed may include when the response as to whether the offloading data is capable of being processed includes the ACK, transmitting, to the server, information necessary for processing the offloading data, and receiving a result of processing the offloading data from the server.

The determining of whether the offloading data is to be processed may include, when the response as to whether the offloading data is capable of being processed includes the NACK, requesting the server to terminate processing of the offloading data.

The change request information may include information related to a request for a change to the offloading point and a request for a change to the requirements.

The determining of whether the offloading data is to be processed may include when the response as to whether the offloading data is capable of being processed includes the change request information, changing the offloading point or the requirements based on the change request information, transmitting, to the server, information necessary for processing offloading data changed based on a result of the changing, and receiving, from the server, a result of processing the offloading data.

The data may include training data for machine learning, and the offloading data may be data trained by the server among the training data.

The determining of the server may include receiving server information from at least one server, and determining, based on the received server information, the server for processing the at least some of the data from among the at least one server.

The determining of whether the offloading data is to be processed may include determining that the offloading data is to be processed by the server, changing the offloading point and the requirements while the offloading data is being processed by the server, transmitting information about the changed offloading point and requirements to the server, and receiving, from the server, a result of processing the offloading data based on the information about the changed offloading point and requirements.

In accordance with another aspect of the disclosure, a method performed by a server of processing offloading data is provided. The method includes determining splitting points at which data received from a UE is splittable and transmitting a list regarding the determined splitting points to the UE, receiving, from the UE, information about an offloading point determined based on the list and information about requirements for offloading data corresponding to the offloading point, transmitting, to the UE, a response as to whether the server is capable of processing the offloading data, and receiving, from the UE, a result of determining whether the offloading data is to be processed based on the response.

In accordance with another embodiment of the disclosure, a UE for offloading data is provided. The UE includes a memory, a transceiver, and at least one processor configured to determine a server for processing at least some of the data, receive, from the server, a list regarding splitting points at which the data is splittable, determine, based on the list, at least one of the splitting points as an offloading point, transmit, to the server, information about the offloading point and information about requirements for offloading data corresponding to the offloading point, receive a response as to whether the offloading data is capable of being processed from the server, and determine whether the offloading data is to be processed, based on the response.

In accordance with another embodiment of the disclosure, a server for processing offloading data is provided. The server includes a memory, a transceiver, and at least one processor configured to determine splitting points at which data received from a UE is splittable and transmit, to the UE, a list regarding the determined splitting points, receive, from the UE, information about an offloading point determined based on the list and information about requirements for offloading data corresponding to the offloading point, transmit, to the UE, a response as to whether the server is capable of processing the offloading data, and receive, from the UE, a result of determining whether the offloading data is to be processed, based on the response.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 7 is a diagram illustrating a system in which a mediator matches a server for offloading data according to an embodiment of the disclosure;

FIG. 8 is a diagram illustrating an operation of allocating server resources to a UE group according to an embodiment of the disclosure;

FIG. 10 shows a table illustrating requirements according to an embodiment of the disclosure;

FIG. 11 shows a table illustrating processing time information according to an embodiment of the disclosure;

Throughout the drawings, like reference numerals will be understood to refer to like parts, components, and structures.

DETAILED DESCRIPTION

Figure 1:
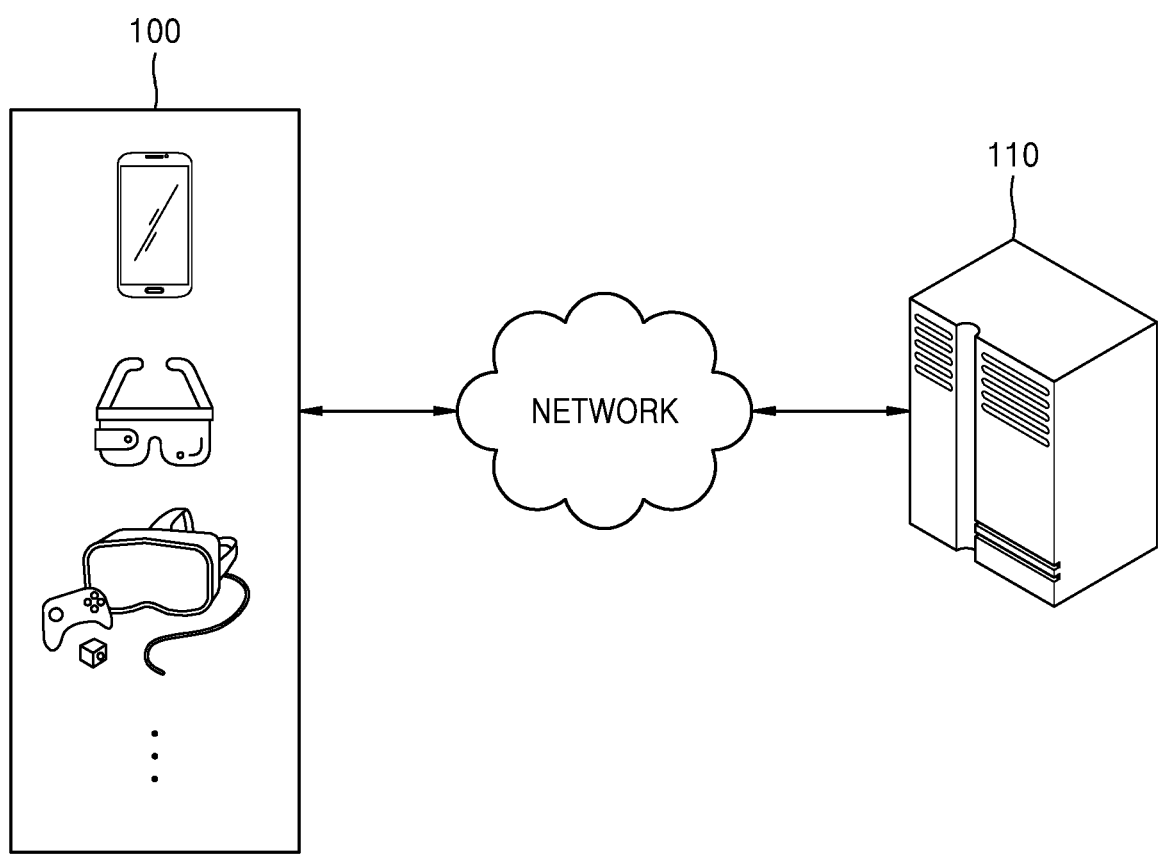
FIG. 1 is a schematic diagram of a system for offloading data according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Throughout the specification, it will be understood that when an element is referred to as being "connected" or "coupled" to another element, it can be directly connected to or electrically coupled to the other element with one or more intervening elements interposed therebetween. Furthermore, when a part "includes" or "comprises" an element, unless there is a particular description contrary thereto, the part may further include other elements, not excluding the other elements.

Throughout the disclosure, the expression "at least one of a, b or c" indicates only a, only b, only c, both a and b, both a and c, both b and c, all of a, b, and c, or variations thereof.

Examples of a terminal may include a user equipment (UE), a mobile station (MS), a cellular phone, a smartphone, a computer, a multimedia system capable of performing a communication function, or the like.

In the disclosure, a controller may also be referred to as a processor.

Throughout the specification, a layer (or a layer apparatus) may also be referred to as an entity.

Expressions, such as "in some embodiments of the disclosure" or "in an embodiment of the disclosure" described in various parts of this specification do not necessarily refer to the same embodiment(s) of the disclosure.

Some embodiments of the disclosure may be described in terms of functional block components and various processing operations. Some or all of such functional blocks may be implemented by any number of hardware and/or software components that perform particular functions. For example, functional blocks of the disclosure may be implemented by one or more microprocessors or by circuit components for performing certain functions. For example, functional blocks according to the disclosure may be implemented with any programming or scripting language. The functional blocks may be implemented using various algorithms executed by one or more processors. Furthermore, the disclosure may employ techniques of the related art for electronics configuration, signal processing and/or data processing. Terms, such as "module" and "configuration" may be used in a broad sense and are not limited to mechanical or physical embodiments.

Furthermore, connecting lines or connectors shown in various figures are intended to represent functional relationships and/or physical or logical couplings between components in the figures. In an actual device, connections between components may be represented by alternative or additional various functional connections, physical connections, or logical connections.

In addition, the expression 'at least one of a or b' indicates 'a or b', or 'both a and b'.

Hereinafter, the disclosure will be described with reference to the accompanying drawings.

FIG. 1 is a schematic diagram of a system for offloading data according to an embodiment of the disclosure.

Referring to FIG. 1, the system for offloading data may include a UE 100 and a server 110.

According to an embodiment of the disclosure, a data offloading method and apparatus for performing, at the server 110, a part of data processing done at the UE 100 may be provided.

Referring to FIG. 1, examples of the UE 100 may include, but are not limited to, a smartphone, a tablet PC, a PC, a smart TV, a mobile phone, a personal digital assistant (PDA), a laptop, a media player, a micro server, a global positioning system (GPS), an electronic book terminal, a digital broadcasting terminal, a navigation device, a kiosk, an MP3 player, a digital camera, home appliances, and other mobile or non-mobile computing devices. Furthermore, the UE 100 may be a wearable device, such as a watch, glasses, a hair band, or a ring, having a communication function and a data processing function. However, embodiments of the disclosure are not limited thereto, and the UE 100 may include any apparatus capable of transmitting or receiving data to or from the server 110 via a network.

According to an embodiment of the disclosure, the network may include a local area network (LAN), a wide area network (WAN), a value added network (VAN), a mobile radio communication network, a satellite communication network, and a combination thereof. Furthermore, the network may be a comprehensive data communication network configured to enable smooth communication across network entities shown in FIG. 1 and include a wired Internet, a wireless Internet, and a mobile wireless communication network.

Examples of a wireless communication technology may include, but are not limited to, a wireless LAN (Wi-Fi), Bluetooth, Bluetooth Low Energy (BLE), ZigBee, Wi-Fi Direct (WFD), Ultra-Wideband (UWB), Infrared Data Association (IrDA), and Near Field Communication (NFC).

In addition, according to an embodiment of the disclosure, the server 110 may communicate with the UE 100 via the network, process data received from the UE 100, and transmit a result of the processing to the UE 100. When at least some of data for the UE 100 is processed by the server 110, the at least some of the data processed by the server 110 is hereinafter referred to as offloading data.

Figure 2:
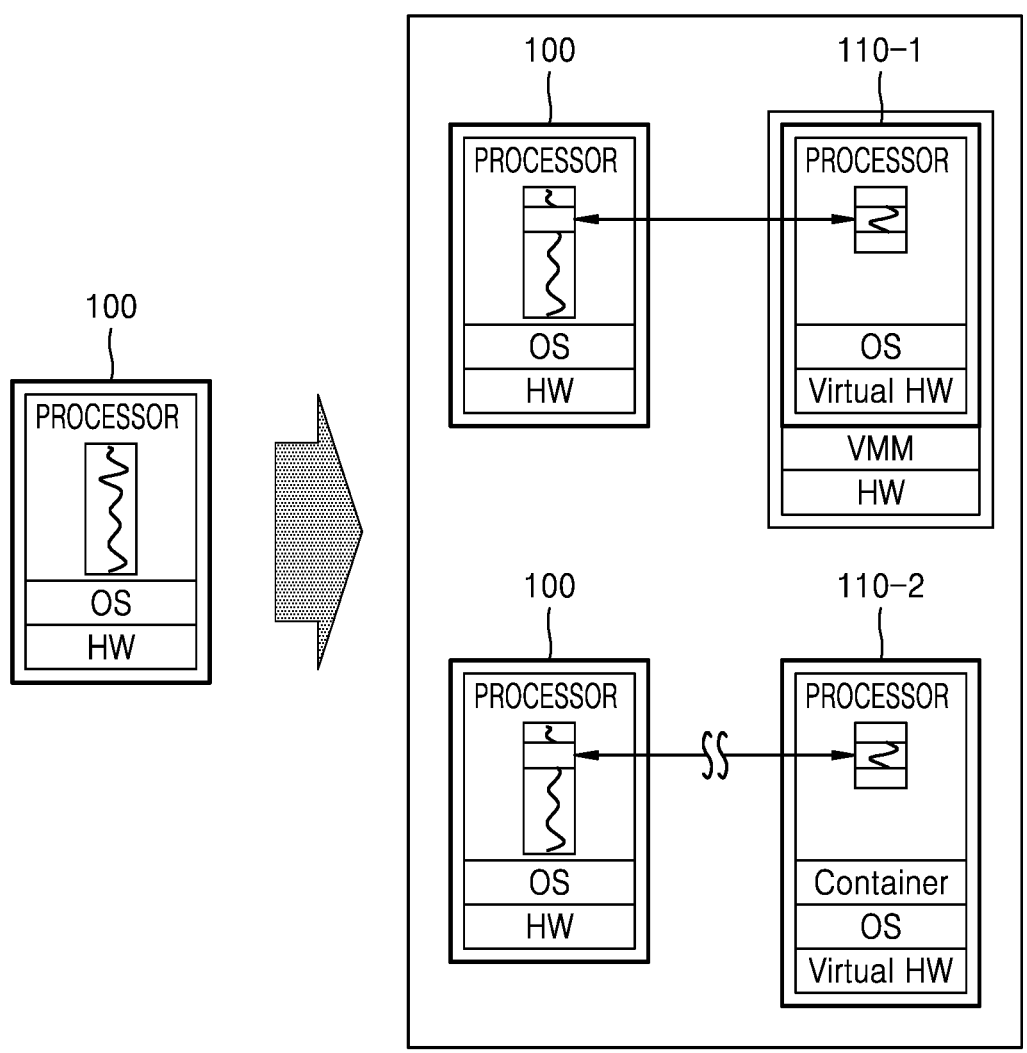
FIG. 2 is a diagram illustrating a server for processing offloading data according to an embodiment of the disclosure.

FIG. 2 is a diagram illustrating a server for processing offloading data according to an embodiment of the disclosure.

Referring to FIG. 2, the UE 100 may include an operating system (OS) and hardware (HW). A processor of the UE 100 may process data. Furthermore, the UE 100 may allow some of its data to be processed on servers 110-1 and 110-2 and receive results of the processing from the servers 110-1 and 110-2. According to an embodiment of the disclosure, the efficiency of data processing may be improved by processing at least some of the data on the servers 110-1 and 110-2 rather than processing all of the data on the UE 100 alone. In this case, the servers 110-1 and 110-2 according to an embodiment of the disclosure are servers configured for more efficient use of physical servers, and may be servers to which a virtualization technology is applied.

According to an embodiment of the disclosure, the server 110-1 is a server for performing computing based on a virtual machine (VM). More particularly, the server 110-1 may be a server for virtualizing hardware resources using a hypervisor. The hypervisor is software that enables multiple OSs to run and may be, for example, a virtual machine monitor (VMM). In other words, the server 110-1 is a server capable of virtualizing hardware and monitoring the virtualized hardware.

Furthermore, according to an embodiment of the disclosure, the server 110-2 is a server that performs container-based distributed computing. A container for the server 110-2 may run an application in its own isolated space. Accordingly, the server 110-2 may run a plurality of applications on one physical server.

The server 110-1 for performing VM-based computing and the server 110-2 for performing container-based computing are merely an example of a server, and embodiments of the disclosure are not limited thereto. The server may be any server capable of receiving and processing data for the UE 100.

Figure 3:
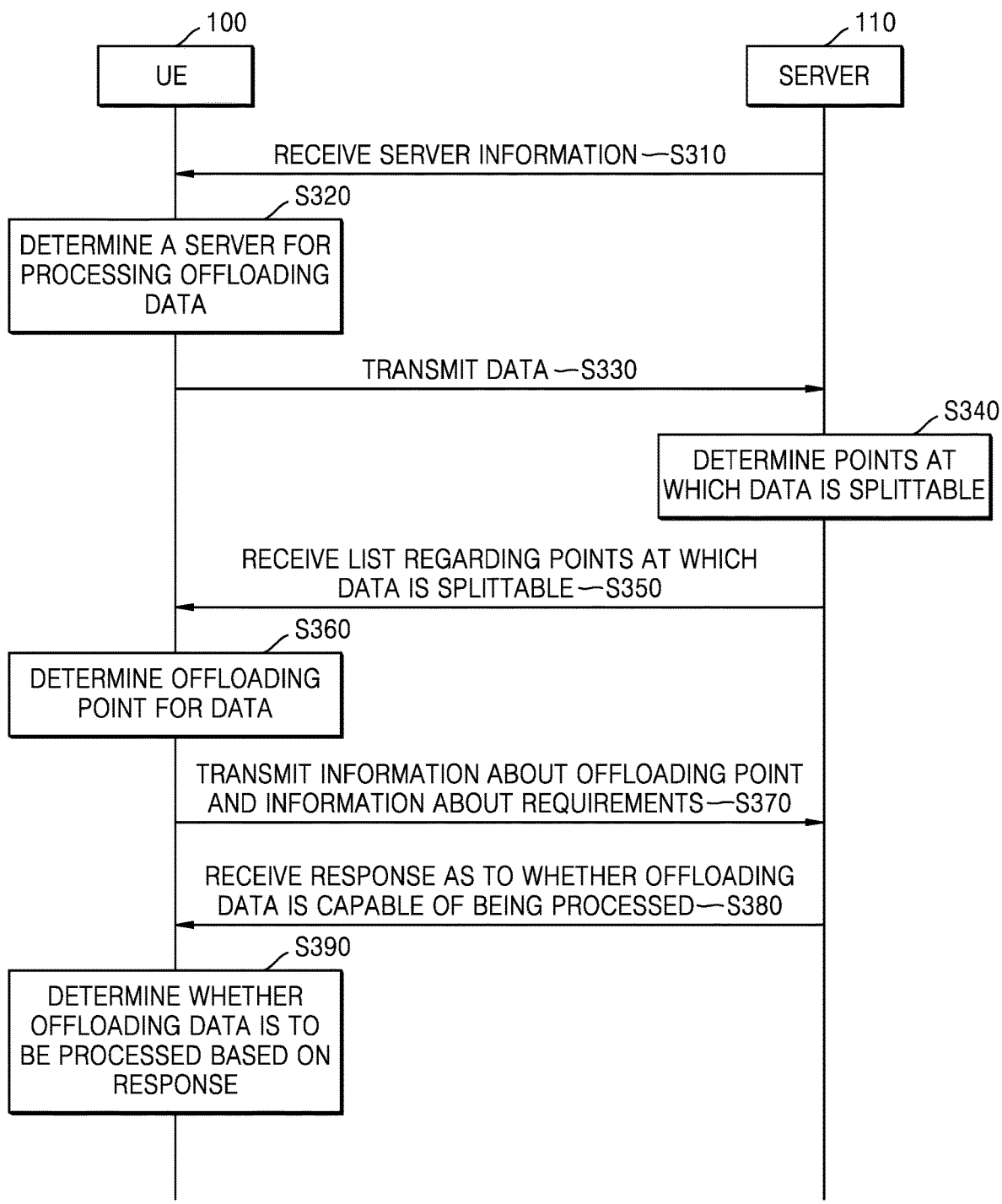
FIG. 3 is a flowchart of a method, performed by a system, of offloading data according to an embodiment of the disclosure.

FIG. 3 is a flowchart of a method, performed by a system, of offloading data according to an embodiment of the disclosure.

Referring to FIG. 3, the UE 100 may receive server information from the server 110 at operation S310. The server information received from the server 110 may include computing capability information of the server 110, capacity information of the server 110, or information about a condition of a communication channel for the server 110.

The UE 100 may determine a server for processing offloading data based on the received server information at operation S320. The UE 100 may determine whether data is suitable for processing in the server 110 based on the server information. The UE 100 may also determine whether to offload the data to the server 110 based on a result of the determination.

The UE 100 may transmit data to the server 110 at operation S330. For example, the data may be an executable file for software constituting an application. In other words, the UE 100 may copy code constituting the executable file for the software and transmit the copied code to the server 110.

The server 110 may determine a splitting point at which the received data is splittable at operation S340. More particularly, upon receipt of the code constituting the executable file for the software, the server 110 may analyze the received code and split the code to determine executable points in the code. In this case, a splitting point may mean a point for splitting the code into code parts that are to be executed even when the code is offloaded because each part has no dependency on the other parts of the code. In other words, the splitting point may be used as a reference for splitting the code into code parts, each part being independently executable. On the other hand, when the UE 100 has sufficient capabilities, the UE 100 may directly analyze the data to determine a splitting point at which the data is splittable.

The UE 100 may receive a list regarding splitting points at which the data is splittable at operation 5350. For example, when a splitting point corresponds to a particular part of the code, the UE 100 may receive a list including information regarding corresponding parts of the code.

The UE 100 may determine an offloading point for the data based on the received list at operation 5360. More particularly, the UE 100 may select, as an offloading point, a point for splitting the data from among the splitting points included in the list. In this case, data corresponding to the offloading point may be determined as offloading data to be processed by the server 110.

The offloading point may include a start point and an end point of offloading data. When the data is code constituting an executable file for software, start and end points of the code may be offloading points. For example, when offloading points are a first line and a 500th line of the code, the first line of the code through the 500th line of the code may be offloading data to be processed by the server 110.

The UE 100 may transmit information about the offloading point and information about requirements corresponding thereto at operation 5370. When the UE 100 transmits information about the offloading point to the server 110, the server 110 may recognize information about offloading data. For example, the server 110 may recognize a start point and an end point of offloading data based on the offloading point.

Furthermore, the UE 100 may transmit information about requirements for the offloading data corresponding to the offloading point. The information about the requirements for the offloading data may include reference information for processing the offloading data.

The UE 100 may receive a response as to whether offloading data is capable of being processed by the server 110 at operation 5380. More particularly, the server 110 may determine whether it is capable of processing the offloading data so as to satisfy the requirements based on the received information about the offloading point and information about the requirements. As a result of the determination, the server 110 may transmit, to the UE 100, a response including information about whether the server 110 is capable of processing the offloading data.

The UE 100 may determine whether the offloading data is to be processed by the server 110 based on the received response at operation 5390. More particularly, when the UE 100 determines that the offloading data is to be processed by the server 110, the UE 100 may transmit information necessary for processing the offloading data to the server 110 and receive a result of the processing of the offloading data from the server 110. In this case, the information necessary for processing the offloading data may be changed according to the response received from the server 110, as described below. On the other hand, when the UE 100 determines that the offloading data is not to be processed by the server 110, the UE 100 may terminate the data offloading procedure.

Figure 4:
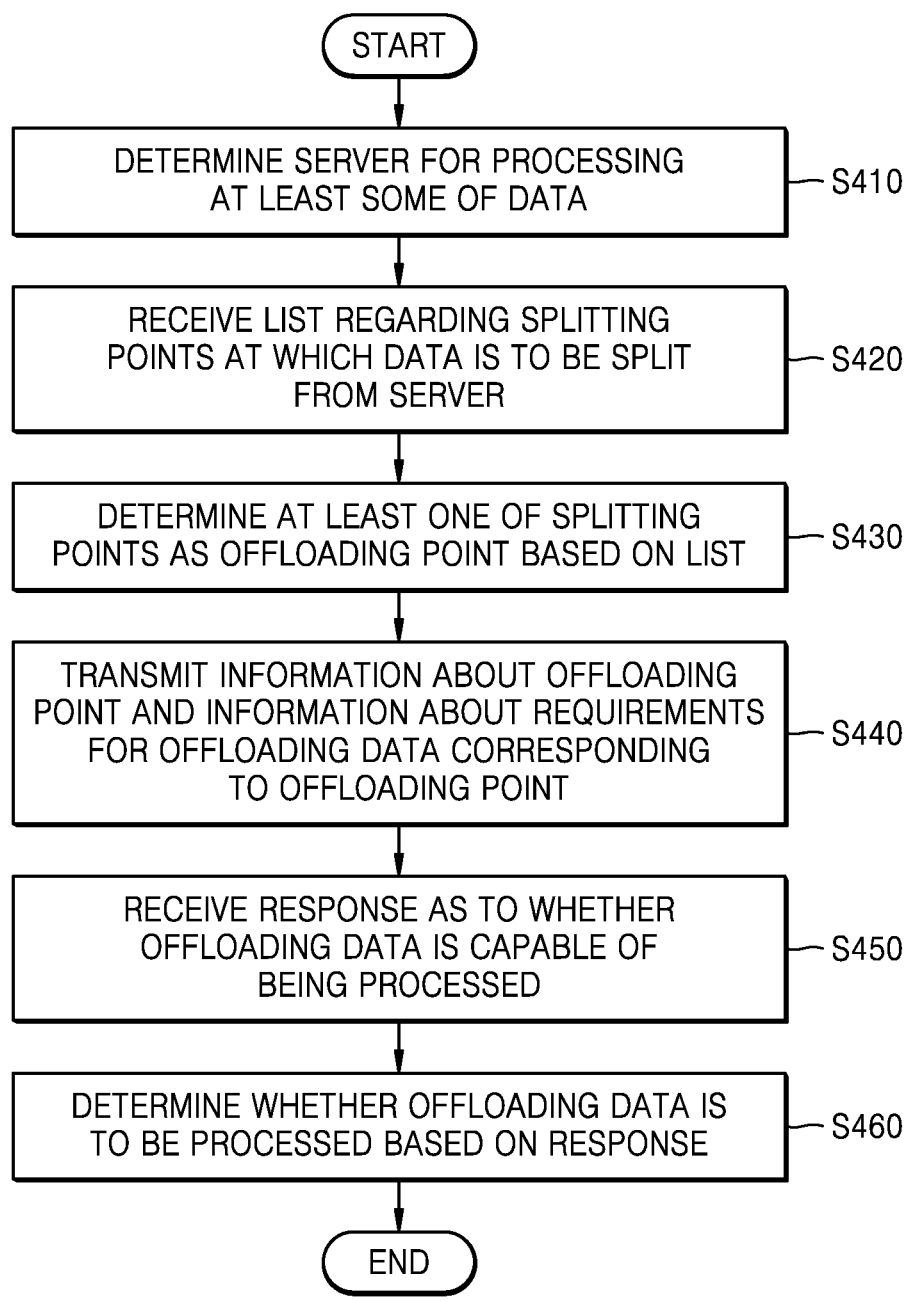
FIG. 4 is a flowchart of a method, performed by a user equipment (UE), of offloading data according to an embodiment of the disclosure.

FIG. 4 is a flowchart of a method, performed by a UE, of offloading data according to an embodiment of the disclosure.

Referring to FIG. 4, the UE 100 may determine the server 110 for processing at least a part of data at operation 5410. More particularly, the UE 100 may receive server information from the server 110 and determine the server 110 for processing at least a part of data for the UE 100 based on the received server information.

The UE 100 may receive a list regarding splitting points at which the data is splittable from the server 110 at operation 5420. More particularly, the UE 100 may copy the data and provide the copied data to the server 110. The data may be a software executable file constituting an application. For example, the data may be Java bytecode constituting an Android application. The UE 100 may provide the copied code to the server 110 and may receive a list regarding splitting points at which the code is splittable from the server 110. For example, when the code is splittable at a first line, a 500th line, a 700th line, and a 1000th line, the UE 100 may receive a list regarding the corresponding splitting points from the server 110.

In the disclosure, although code constituting an application has been described as an example of data for convenience, a type of the data is not limited thereto, and the data may be any type of data capable of being processed by the UE 100 or the server 110. For convenience of description, splitting points at which data is splittable are hereinafter indicated as A, B, C, and D.

The UE 100 may determine at least one of the splitting points as an offloading point based on the list at operation 5430. When the UE 100 determines points A and B as offloading points, data corresponding to point A to point B may be determined as offloading data. On the other hand, when the UE 100 selects only point A as an offloading point, offloading data may be data before or after point A. In other words, the offloading point may be used as a reference for determining the offloading data.

The UE 100 may transmit, to the server 110, information about the offloading point and information about requirements for offloading data corresponding to the offloading point at operation 5440. For example, the UE 100 may transmit points A and B determined as the offloading points to the server 110. Furthermore, the UE 100 may transmit information about requirements for offloading data corresponding to point A to point B to the server 110. The information about the requirements may include reference information for processing the offloading data corresponding to point A to point B. For example, the requirements may include information indicating that a latency of less than 3 ms or image quality of 4K or higher should be satisfied. Information that may be included in the requirements will be described below with reference to FIG. 10.

The UE 100 may receive, from the server 110, a response as to whether the offloading data is capable of being processed by the server 110 at operation 5450. Determining whether the offloading data is to be processed by the server 110 may mean determining whether the server 110 is capable of processing the offloading data so as to satisfy the requirements therefor. The response received from the server 110 may include an indicator indicating whether the server 110 is capable of processing the offloading data. While an acknowledgement (ACK) or negative-ACK (NACK) will be hereinafter described, for convenience, as an example of an indicator indicating whether the server 110 is capable of processing offloading data, a type of the indicator is not limited thereto, and the indicator may be any type of indicator capable of indicating whether the server 110 is capable of processing the offloading data.

More particularly, when the server 110 is capable of processing the offloading data so as to satisfy the received requirements, the response may include an ACK. On the other hand, when the server 110 is not capable of processing the offloading data so as to satisfy the requirements, the response may include a NACK when the requirements are mandatory requirements and include change request information when the requirements are not mandatory requirements.

The UE 100 may determine whether the offloading data is to be processed by the server 110 based on the received response at operation 5460. The received response may include at least one of an ACK, a NACK, or change request information.

More particularly, when the received response includes only an ACK, the UE 100 may transmit information necessary for processing the offloading data to the server 110 and receive a result of the processing of the offloading data from the server 110. In this case, the information necessary for processing the offloading data may be data context information stored in a memory of the UE 100. More particularly, a result value of data processed by the UE 100 may be an input value for the offloading data to be processed by the server 110, and thus, the UE 100 may transmit data context information previously stored in the memory to the server 110. For example, when a code corresponding to point B to point C is determined as offloading data, the UE 100 may transmit data necessary for executing the code corresponding to point B to point C to the server 110. In this case, the information necessary for processing the offloading data may be a result value obtained by executing the code corresponding to point A to point B or a data context.

On the other hand, when the received response includes a NACK, the UE 100 may determine to terminate the offloading procedure. The UE 100 may request the server 110 to terminate the offloading procedure. Furthermore, when the offloading procedure is terminated, the UE 100 may process data alone or request offloading of its data from a new server 110.

In addition, when the received response includes change request information along with an ACK or NACK, the UE 100 may determine whether to change the offloading point or requirements based on the change request information. In other words, when the response as to whether the offloading data is capable of being processed by the server 110 includes change request information, the UE 100 may change the offloading point or requirements based on the change request information and transmit, to the server 110, information necessary for processing offloading data changed based on the changed offloading point or requirements. When the offloading point is changed, information necessary for processing the changed offloading data may include data context information of the UE 100, corresponding to the changed offloading point. For example, when offloading data corresponding to point B to point C is changed to offloading data corresponding to point C to point D, information necessary for processing the changed offloading data may be obtained by changing information for executing a code corresponding to point B to point C to information necessary for executing a code corresponding to point C to point D.

Moreover, when the requirements are changed, information necessary for processing the changed offloading data may include information about the changed requirements. The requirement information will be described below with reference to FIG. 10.

Figure 5:
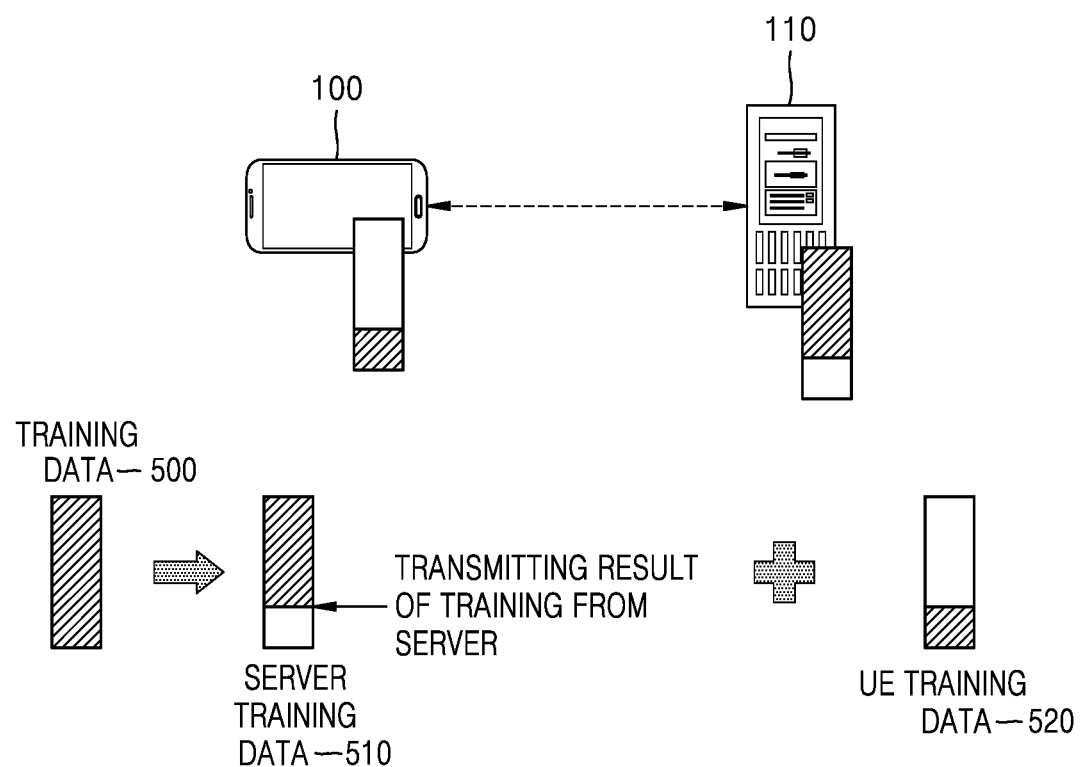
FIG. 5 is a diagram illustrating distributed machine learning according to an embodiment of the disclosure.

FIG. 5 is a diagram illustrating distributed machine learning according to an embodiment of the disclosure.

Referring to FIG. 5, the UE 100 may perform distributed machine learning which allows the server 110 to process at least some of training data 500 for machine learning. More particularly, the server 110 may perform training on training data 510 for the server 110, including at least some of the training data 500. Furthermore, the server 110 may transmit a result of the training of the training data 510 to the UE 100. In addition, the UE 100 may perform training on training data 520 for the UE 100 based on the result of the training of the training data 510, which is received from the server 110. Moreover, the UE 100 may perform inference on certain data based on the results of training of the training data 510 and the training data 520. More particularly, the UE 100 may infer an output value for input data based on results of distributed training on the training data 500. Furthermore, the inference on the data may also be performed by the UE 100 and the server 110 in a distributed manner.

Although FIG. 5 shows an example in which the UE 100 additionally performs training based on a training result from the server 110, the training may be performed the other way round, i.e., the UE 100 may first train at least some of the training data 500 and then the server 110 may additionally performs training based on a training result from the UE 100. Furthermore, the UE 100 may receive the result of training from the server 110 and infer an output value for input data based on a received result of distributed training. In addition, the server 110 may perform distributed inference by inferring an output value for input data based on the result of distributed training.

Figure 6A:
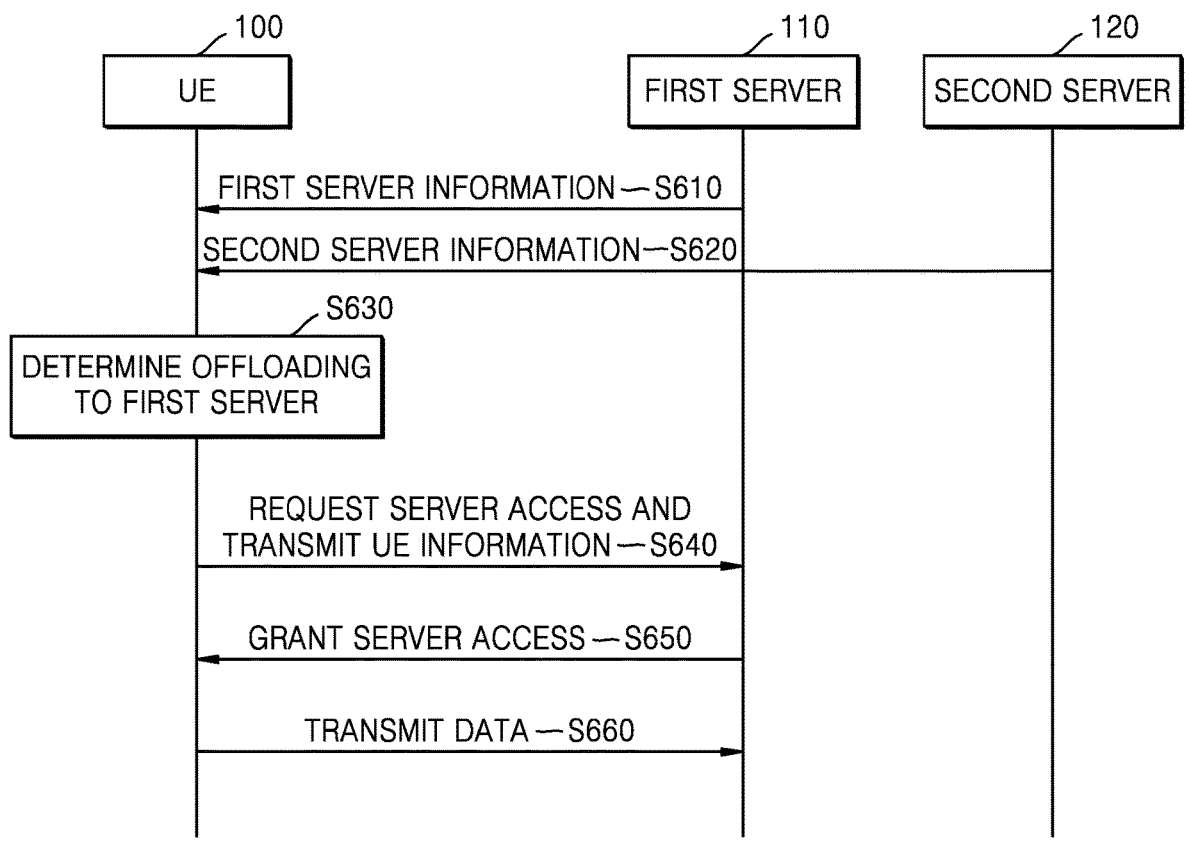
FIG. 6A is a diagram illustrating a method, performed by a UE, of determining a server for performing data offloading according to an embodiment of the disclosure.

FIG. 6A is a diagram illustrating a method, performed by a UE, of determining a server for performing data offloading according to an embodiment of the disclosure.

Referring to FIG. 6A, before offloading its data, the UE 100 may determine a server for performing offloading. Although FIG. 6A shows an example in which server information is first broadcast to the UE 100, the UE 100 may first broadcast UE information to a server. More particularly, when the UE information is first broadcast to the server, the server may broadcast server information to the UE 100 based on the broadcast UE information.

The UE 100 may receive first server information from a first server 110 at operation 5610. Furthermore, the UE 100 may receive second server information from a second server 120 at operation 5620.

The UE 100 may determine to offload its data to the first server 110 at operation 5630. More particularly, the UE 100 may determine to offload the data to the first server 110 that is one of the first and second servers 110 and 120 based on the received first server information and second server information. For example, the UE 100 may determine to offload the data to the first server 110 by taking into account channel conditions, supportable quality of service (QoS), capacity information, or the like, for the first and second servers 110 and 120, which are respectively included in the first server information and the second server information.

The UE 100 may transmit a server access request and UE information to the first server 110 at operation 5640. The first server 110 may then transmit an access grant to the UE 100 based on the received server request access and UE information at operation 5650. Accordingly, the UE 100 may be connected to the first server 110 via a network.

The UE 100 may transmit the data to the first server 110 at operation 5660. More particularly, the UE 100 may copy code and transmit the copied code to the first server 110 in advance. Descriptions of an offloading procedure are already provided above with respect to FIGS. 1 to 5, and thus will be omitted here.

Figure 6B:
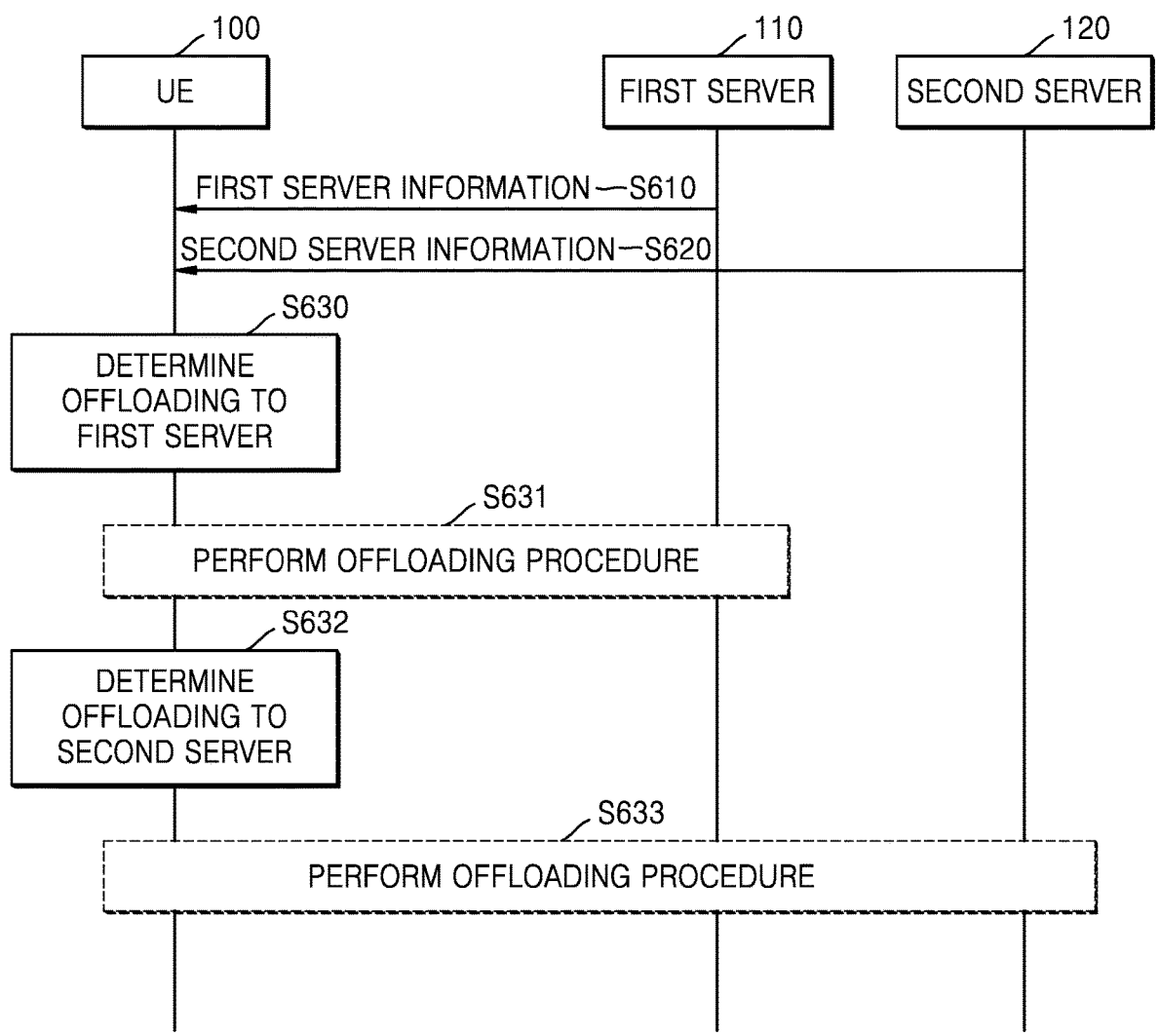
FIG. 6B is a diagram illustrating a method, performed by a UE, of changing or adding a server for performing data offloading while performing an offloading procedure according to an embodiment of the disclosure.

FIG. 6B is a diagram illustrating a method, performed by a UE, of changing or adding a server for performing data offloading while performing an offloading procedure according to an embodiment of the disclosure;

Descriptions that are already provided above with respect to FIG. 6A will be omitted when describing the method of FIG. 6B.

Referring to FIG. 6B, the UE 100 may determine to offload data to the first server 110 at operation 5630. In this case, when the data is related to a delay-sensitive service, the UE 100 may determine to offload the data to the first server 110 and transmit the data in advance to the second server 120, which is a candidate server, as well as the first server 110. On the other hand, when the data is related to a delay-insensitive service, the UE 100 may transmit data only to the first server 110 and may not transmit the data to the second server 120 as a candidate server in advance.

The UE 100 may perform an offloading procedure for offloading to the first server 110 at operation 5631.

The UE 100 may determine to offload the data to the second server 120 while performing the offloading procedure at operation 5632. In this case, the second server 120 may be added such that the UE offloads the data to the second server 120 as well as the first server 110. Moreover, the UE 100 may change a server to which the data is to be offloaded from the first server 110 to the second server 120. In other words, the UE 100 may add or change the second server 120 based on a result of the offloading procedure performed with the first server 110.

The UE 100 may perform an offloading procedure for offloading to the second server 120 at operation 5633. In this case, when the data is previously transmitted to the second server 120 because the data is related to a delay-sensitive service, the second server 120 may perform an offloading procedure based on the previously transmitted data, which facilitates processing of the delay-sensitive. On the other hand, when the data is not previously transmitted to the second server 120 because the data is related to a delay-insensitive service, the second server 120 may receive offloading data from the UE 100 and perform processing only on the received offloading data, which allows efficient use of capacity of the second server 120.

FIG. 7 is a diagram illustrating a system in which a mediator matches a server for performing offloading of data according to an embodiment of the disclosure.

According to an embodiment of the disclosure, a separate mediator 700 may determine a server to which data for the UE 100 is to be offloaded. The mediator 700 is a device for determining a server to which data for the UE 100 is to be offloaded, and may be configured as a server or a network entity.

Referring to FIG. 7, the mediator 700 may receive UE information from the UE 100. Furthermore, the mediator 700 may respectively receive first server information and second server information from the first and second servers 110 and 120. The mediator 700 may determine which of the first and second servers is to match the UE 100 based on the first server information and the second server information.

The mediator 700 may transmit a matching result to the UE 100, the first server 110, and the second server 120. For example, when the mediator 700 determines to match the UE 100 with the first server 110, the UE 100 may perform an offloading procedure for offloading to the first server 110 according to the matching result.

Moreover, according to an embodiment of the disclosure, the mediator 700 may determine not only which server is to match the UE 100 but also which part of offloading data 750 is to be processed at each of the first and second servers 110 and 120. Referring to FIG. 7, the mediator 700 may analyze splitting points at which the offloading data 750 is splittable as points A through C. The mediator 700 may determine offloading data 751 to be processed at the first server 110 as being data corresponding to point A to point B of the offloading data 750. Furthermore, the mediator 700 may determine offloading data 752 to be processed at the second server 120 as being data corresponding to point B to point C of the offloading data 750. In other words, the UE 100 allows the first server 110 to process the offloading data 751 for the first server 110 as some of the offloading data 750 while allowing the second server 120 to process the offloading data 752 for the second server 120 as the rest thereof.

FIG. 8 is a diagram illustrating an operation of allocating server resources to a UE group according to an embodiment of the disclosure.

Referring to 810 of FIG. 8, at least some of available resources of the server 110 may be allocated to a particular UE group. More particularly, when a particular UE group subscribes to a certain service, the server 110 may allocate some of the available resources of the server 110 to the particular UE group in order to support the service for the UE group. In this case, when the particular UE group pays a fee for subscription to the service, the server 110 may allocate different resources to the particular UE group according to the paid fee or characteristics of the service.

Furthermore, referring to 820 of FIG. 8, when resources previously reserved on the particular UE group are insufficient, additional resources of the server 110 may be allocated to the UE group. More particularly, when the server 110 has available resources other than the previously reserved resources on the particular UE group, the server 110 may allocate additional resources to the particular UE group, and the UE group may use the additional resources.

In addition, referring to 830 of FIG. 8, when the resources previously reserved on the particular UE group are sufficient, the server 110 may use fewer resources than the previously reserved resources for the particular UE group.

Figure 9:
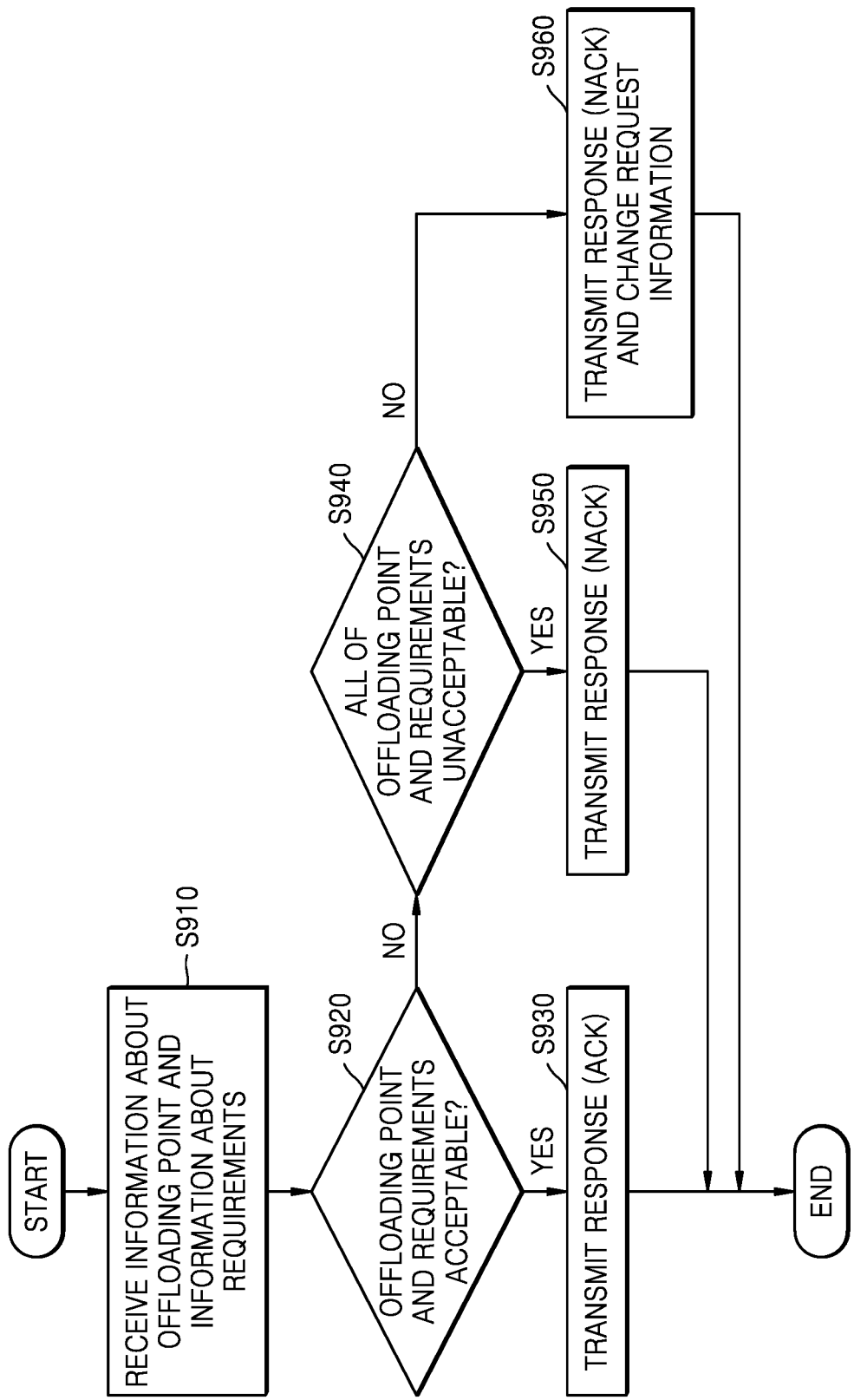
FIG. 9 is a flowchart of a method of determining offloading data or requirements according to an embodiment of the disclosure.

FIG. 9 is a flowchart of a method of determining offloading data or requirements corresponding thereto according to an embodiment of the disclosure.

More particularly, FIG. 9 is a flowchart illustrating a server's response when information about an offloading point and information about requirements received from the UE 100 are recommended requirements.

Referring to FIG. 9, the server 110 may receive information about the offloading point and information about requirements at operation 5910.

The server 110 may then determine whether the offloading point and the requirements are acceptable based on the received information at operation 5920. When the server 110 determines that the offloading point and the requirements are acceptable in operation 5920, the server 110 may transmit a response including an ACK at operation 5930.

When the offloading point and the requirements are mandatory requirements, the server 110 is required to transmit a response including a NACK when even at least some of the offloading point and requirements are not acceptable. In other words, when the offloading point and the requirements are mandatory requirements, the server 110 is unable to change any of the offloading point and requirements, so it does not need to determine whether all of the offloading point and requirements are unacceptable.

On the other hand, when the server 110 determines that the offloading point and the requirements are not acceptable in operation 5920, the server 110 may determine whether all of the offloading points and requirements are unacceptable at operation 5940. In other words, in this case, the offloading point and requirements may be recommended requirements.

When all of the offloading point and requirements are unacceptable, the server 110 may transmit a response including a NACK at operation 5950. On the other hand, according to an embodiment of the disclosure, even when all of the offloading points and requirements are unacceptable, the server 110 may transmit a response including information indicating a proposal of a new offloading point or new requirements.

When even some of the offloading point and the requirements are acceptable, the server 110 may transmit a response including a NACK and change request information at operation 5960. More particularly, the server 110 may request a change to an unacceptable part of the offloading point and requirements.

FIG. 10 shows a table illustrating requirements according to an embodiment of the disclosure.

Referring to FIG. 10, a type 1010 of requirements may include a case where requirements for offloading data are mandatory requirements (1011) and a case where the requirements for offloading data are recommended requirements (1015).

In the case where the requirements for offloading data are mandatory requirements that must be satisfied (1011), when the server 110 is not capable of accepting the mandatory requirements, the server 110 may return a NACK, or when there is no response within a preset time period, the response is considered a NACK (1012). In other words, although the server 110 should return a NACK when it is not capable of accepting at least some of the mandatory requirements, the response may also be considered a NACK even when there is no response. Furthermore, when the server 110 is not capable of accepting the mandatory requirements, the server 110 may delete or drop the received data and may not perform an offloading procedure.

Moreover, when the server 110 is not capable of accepting the mandatory requirements, it may further return a NACK and details of a change request (1013). More particularly, when the server 110 is not able to satisfy the mandatory requirements, it may propose details of a change request for changing the mandatory requirements while returning a NACK. For example, the server 110 may return, along with a NACK, minimum and/or maximum requirement information that the server 110 itself is able to provide. Furthermore, the server 110 may include, in the details of the change request, QoS requirements corresponding to a request for reduction of a volume of offloading data or a downgraded service.

On the other hand, when the server 110 is capable of accepting the mandatory requirements, the server 110 may return an ACK, or when no response is received within a preset time period, the response is considered an ACK (1014). Moreover, when no response is received within the preset time period, information about whether the response is considered an ACK or NACK may be included in details of the mandatory requirements or may be preset between the UE 100 and the server 110. For example, in a case where the details of the mandatory requirements include information indicating that 'when no response is received from the server 110 within 5 ms, the response is considered an ACK', the UE 100 may consider the response as an ACK when a response is not actually received from the server 110 within 5 ms, and may continue to perform the offloading procedure.

In the case where the requirements for offloading data are recommended requirements (1015), the server 110 may not return a NACK even when it is not capable of accepting the recommended requirements (1016). In other words, even when the server 110 is not capable of accepting the recommended requirements, the server 110 may process offloaded data based on the changed requirements. Accordingly, when the recommended requirement are not acceptable, the server 110 may transmit information about a difference between the recommended requirements and the changed requirements together with a NACK or ACK.

On the other hand, when the server 110 is capable of accepting the recommended requirements, it may return an ACK, or when there is no response, the response is considered an ACK (1017). As described above, when no response is received from the server 110, whether the response is considered an ACK or NACK may be included in details of the recommended requirements or may be preset between the UE 100 and the server 110.

According to an embodiment of the disclosure, details 1020 of the requirements may include QoS information, capacity information, and processing time information. More particularly, the QoS information may mean information about minimum QoS requirements that must be satisfied when processing offloading data. For example, the QoS information may include image quality information, data transfer rate information, latency information, or the like, but is not limited thereto and may include any information related to QoS.

Furthermore, the capacity information may be information about a memory capacity required for processing offloading data. For example, the server 110 may determine whether a memory capacity available for processing offloading data is to satisfy the requirements of the UE 100.

The processing time information included in the details 1020 of the requirements is now described more fully with reference to FIG. 11.

FIG. 11 shows a table illustrating processing time information according to an embodiment of the disclosure.

Referring to FIG. 11, the details 1020 of the requirements received from the UE 100 may include processing time information 1021. The processing time information 1021 is information related to a UE estimated time and a server estimated time. The server 110 may determine a response to the requirements for offloading data based on the processing time information 1021.

More particularly, the UE 100 may estimate the time it takes for the server 110 to process offloading data. A value obtained when the UE 100 estimates the time it takes for the server 110 to process offloading data is hereinafter referred to as a UE estimated time. Furthermore, the server 110 may estimate the time it takes for the server 110 itself to process offloading data, and the estimated time is hereinafter referred to as a server estimated time. In this case, the server estimated time may be more accurate than the UE estimated time. More particularly, because the server 110 is able to predict the amount of computation in real-time based on information received from the UE 100, the server estimated time may be more accurate than the UE estimated time. In other words, the server estimated time is more accurate than the UE estimated time because the UE estimated time does not take into account the real-time channel or server conditions while the server estimated time may reflect real-time information.

When a sum of the UE estimated time and network latency is shorter than the time required when the UE 100 directly processes offloading data, the UE 100 may determine that processing the offloading data at the server 110 is more efficient than directly processing the offloading data. In this case, the network latency may refer to a sum of the time required to transmit offloading data to the server 110 and the time required to receive a result of the processing of the offloading data from the server 110. In other words, the UE 100 may request the server 110 to process offloading data when the sum of the UE estimated time and the network latency is less than a preset threshold. More particularly, the UE 100 may request the server 110 to process the offloading data when the sum of the UE estimated time, the time required to transmit the offloading data, and the time required to receive a result of the processing is less than the preset threshold.

Moreover, because the server estimated time is more accurate than the UE estimated time, when the server estimated time is longer than the UE estimated time, it may be understood that the actual time it takes for the server 110 to process the offloading data is longer than the time expected on the UE 100. In other words, when the server estimated time is longer than the UE estimated time, the server 110 may determine that the time it takes to process the offloading data is longer than the time expected on the UE 100 and transmit a response including a NACK. Moreover, the server 110 may transmit change request information related to a change to requirements, together with the NACK.

On the other hand, when the UE estimated time is longer than the server estimated time, the server 110 may determine that the time it takes to process the offloading data is shorter than the time expected on the UE 100 and transmit a response including an ACK. Moreover, even in this case, the server 110 may transmit change request information for proposing a change to requirements, together with the ACK.

When the server 110 informs the UE 100 of capability information of the server 110, a UE estimated time may be obtained by using Equation 1 below:

$$t_s = \frac{w}{w_{unit}} t_{unit} \qquad \text{Equation 1}$$

Referring to Equation 1, the UE estimated time $t_s$ may be a product obtained by multiplying a result of dividing a computation amount w of the UE 100 by a unit computation amount of the server 110 and a unit time required to calculate the unit computation amount of the server 110.

Furthermore, the UE 100 may directly estimate a UE estimated time by using the following Equation 2:

$$t_s = \frac{w}{\mu f_s} = \frac{t_1 f_1}{\mu f_s} \qquad \text{Equation 2}$$

In Equation 2, parameter values are as follows:

$t_s$ is the UE estimated time, $f_l$ is a UE computation capability, w is a computation amount of the UE 100, $t_l$ a is a time required for the UE 100 actually measure the computation amount w, µ is a ratio of allocatable resources of the server 110, and $f_s$ is a computation capability of the server 110. Information about these parameter values may be received via server information when the server 110 is determined, or may be periodically received from the server 110.

Furthermore, a serve estimated time may be obtained by using Equation 3 below:

$$t_{s,real-time} = \frac{w}{w_{unit}} t_{unitreal-time} \qquad \text{Equation 3}$$

The server estimated time may be obtained by taking into account a unit computation amount of the server 110 in real-time.

Figure 12:
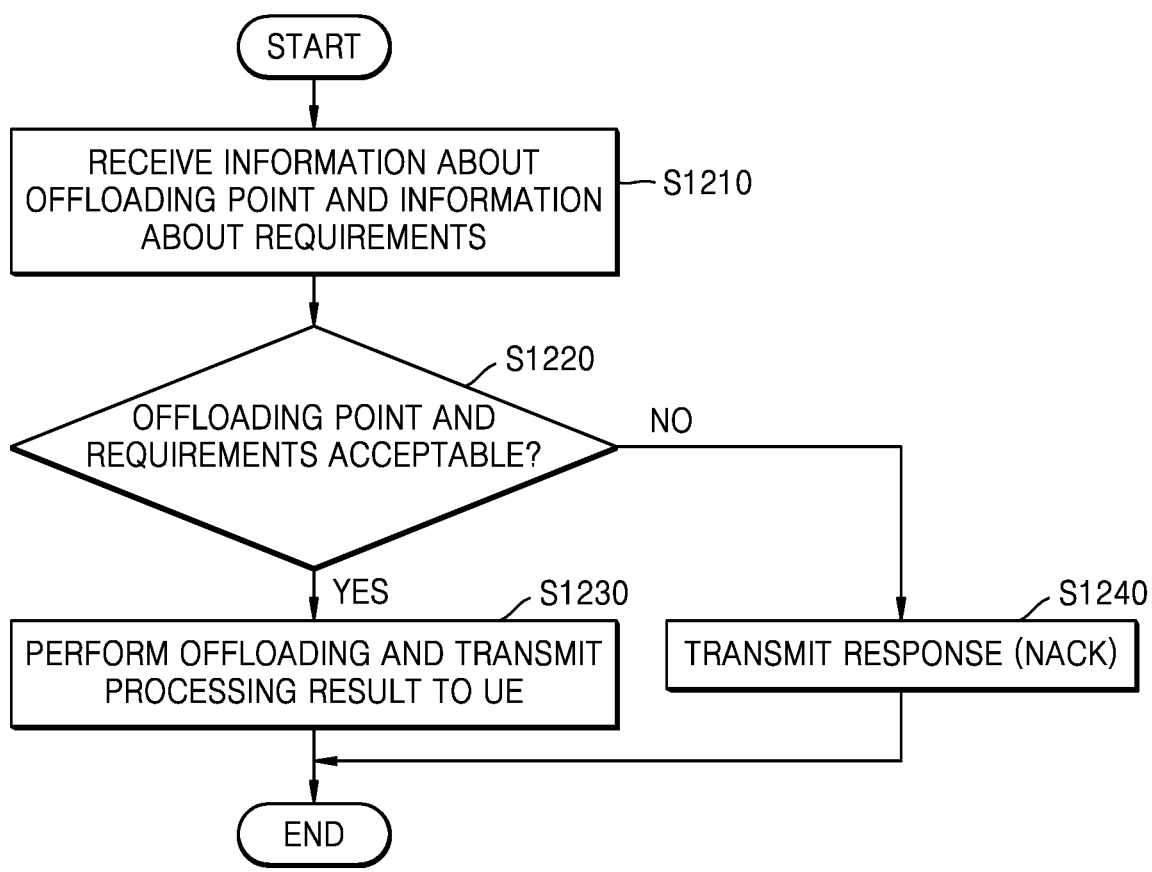
FIG. 12 is a flowchart illustrating operations of a server according to an embodiment of the disclosure.

FIG. 12 is a flowchart illustrating operations of a server according to an embodiment of the disclosure.

Referring to FIG. 12, the server 110 may receive information about an offloading point and information about requirements at operation S1210. Furthermore, the server 110 may determine whether the offloading point and the requirements are acceptable based on the received information at operation S1220.

When the server 110 determines that the offloading point and the requirements are acceptable, the server 110 may perform offloading and transmit a processing result to the UE 100 at operation S1230. More particularly, when the server 110 determines that the offloading point and the requirements are acceptable, the server 110 may receive information necessary for processing offloading data from the UE 100 and process the offloading data based on the received information. Furthermore, the server 110 may transmit a result of the processing to the UE 100.

On the other hand, when the server 110 determines that the offloading point and the requirements are not acceptable, the server 110 may transmit a response including a NACK at operation S1240. In this case, the offloading procedure may be terminated. For example, the server 110 may receive, from the UE 100, a request for termination of the processing of the offloading data. On the other hand, even when the server 110 transmits a response including a NACK to the UE 100, the UE 100 may not terminate the offloading procedure but request again the server 110 to perform offloading by downgrading the requirements or request the server 110 to resume the offloading procedure after a lapse of a preset time period.

Furthermore, when the server 110 determines that the offloading point and the requirements are not acceptable, the server 110 may include its minimum guarantees together with the NACK in the response for transmission. The minimum guarantees may mean minimum guarantees supported by the server 110. For example, the minimum guarantees may include information indicating a 'maximum latency of less than 5 ms' and 'processing offloading data with a minimum 4K image quality'. According to an embodiment of the disclosure, the server 110 may broadcast the minimum guarantees for every preset period or aperiodically. In this case, the UE 100 may determine whether to change the offloading point and the requirements based on the broadcast minimum guarantees of the server 110.

Figure 13:
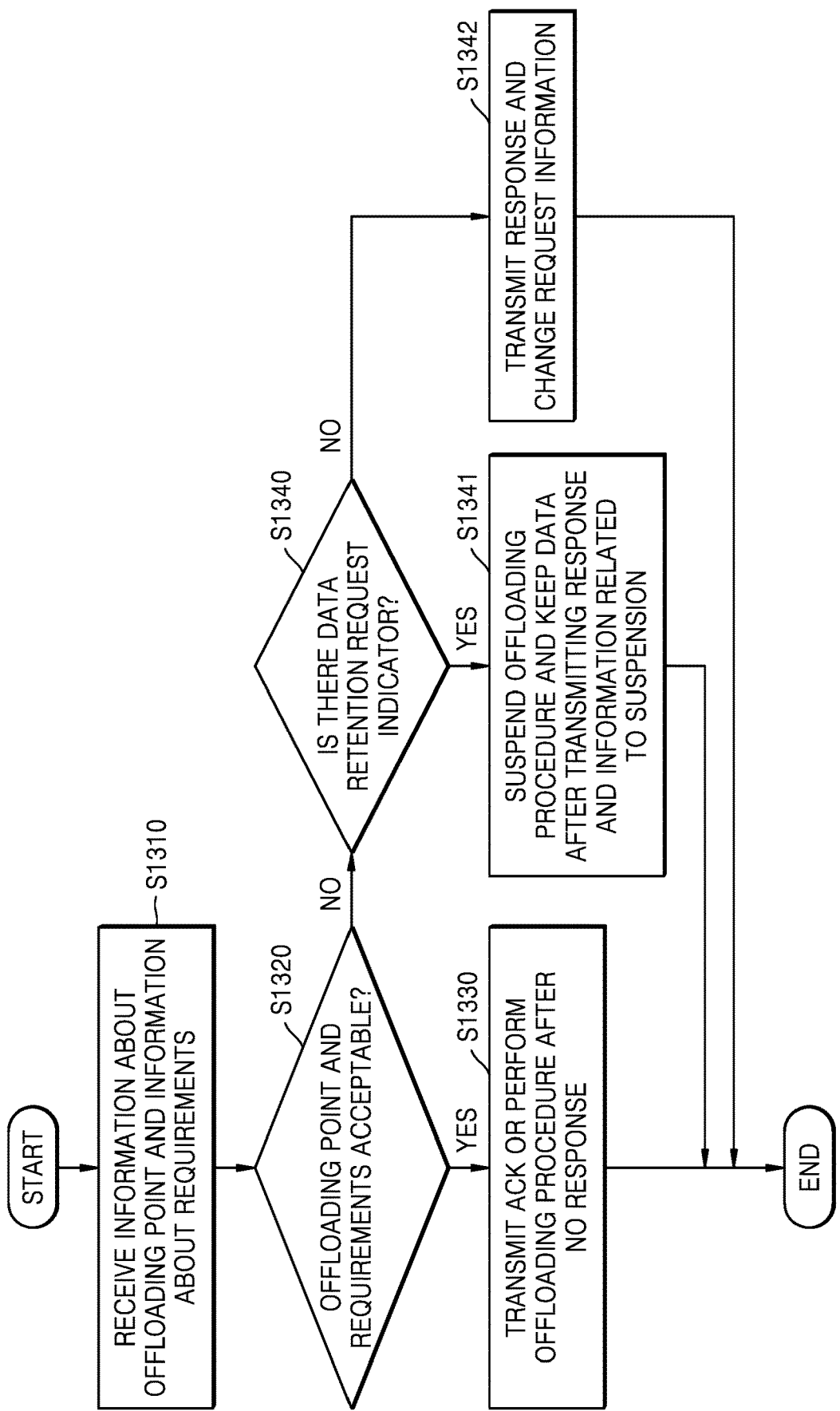
FIG. 13 is a flowchart illustrating operations of a server according to an embodiment of the disclosure.

FIG. 13 is a flowchart illustrating operations of a server according to an embodiment of the disclosure.

Referring to FIG. 13, the server 110 may determine whether to process offloading data according to whether a data retention request is received. Descriptions that are already provided above with respect to FIGS. 1 to 5, 6A and 6B, and 7 to 12 will be omitted herein when describing operations S1310 and S1320.

The server 110 may receive information about an offloading point and information about requirements at operation S1310. Furthermore, the server 110 may determine whether the offloading point and the requirements are acceptable based on the received information at operation S1320.

When the server 110 determines that the offloading point and the requirements are acceptable, the server 110 may or may not transmit a response including an ACK at operation S1330. When the response is not received within a preset time period, the UE 100 may determine that an ACK has been received. In this case, the server 110 may perform an offloading procedure based on offloading data.

The server 110 may determine whether there is a received data retention request indicator at operation S1340. The data retention request indicator refers to an indicator requesting the server 110 to retain previously received data instead of deleting or dropping it. The data retention request indicator may be included in information about the requirements for transmission.

When the server 110 determines that there is the received data retention request indicator, the server 110 may transmit a response and information related to suspension at operation S1341. Because the server 110 is not able to accept the offloading point or requirements, it may transmit a response including a NACK. Moreover, because there is the received data retention request indicator, the server 110 may stop or suspend the offloading procedure for a preset time period without terminating the offloading procedure. Furthermore, the server 110 may transmit information related to suspension of the offloading procedure. In addition, the server 110 may transmit difference information regarding the requirements, together with the response. After transmission of the response and the information related to the suspension, the server 110 may not perform an offloading procedure but retain data for resuming the offloading procedure later.

When the server 110 determines that there is no received data retention request indicator, the server 110 may transmit a response and change request information at operation S1342. More particularly, the server 110 may transmit a response including an ACK or NACK depending on whether the requirements are mandatory or recommended requirements. Moreover, the server 110 may additionally transmit change request information regarding the requirements, together with the ACK or NACK.

Figure 14:
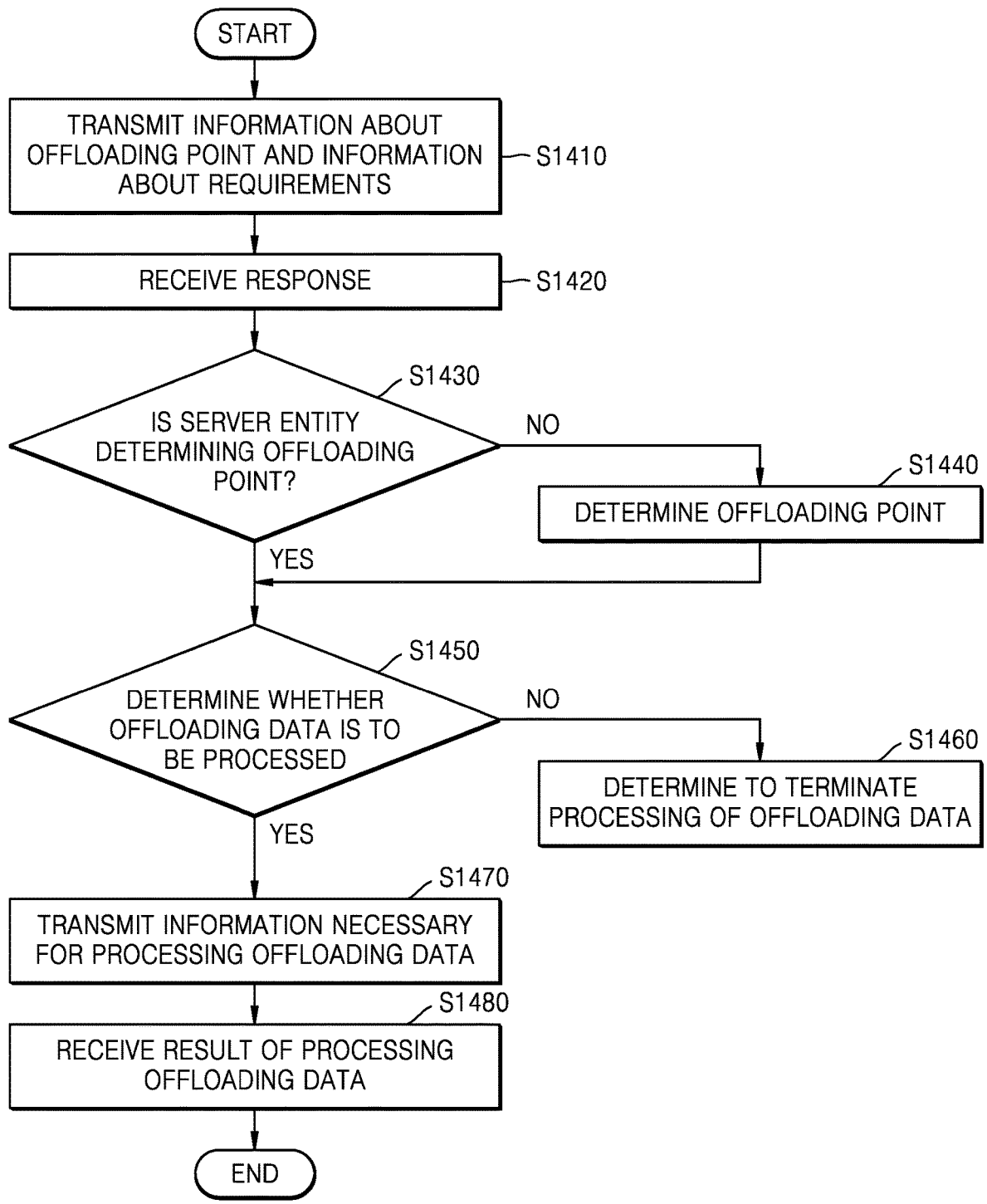
FIG. 14 is a flowchart illustrating operations of a UE according to an entity determining an offloading point according to an embodiment of the disclosure.

FIG. 14 is a flowchart illustrating operations of the UE 100 according to an entity determining an offloading point according to an embodiment of the disclosure.

According to the above-described offloading procedure, the UE 100 may determine an offloading point, receive a response to the determined offloading point from the server 110, and determine a final offloading point based on the received response. In other words, an example in which the UE 100 is an entity determining an offloading point has been described.

When the server 110 is not an entity determining the offloading point in operation S1430, i.e., when the UE 100 is an entity determining the offloading point, the UE 100 may determine the offloading point at operation S1440.

Referring to FIG. 14, the server 110 may determine the offloading point. More particularly, when the server 110 is the entity determining the offloading point in operation S1430, the server 110 may determine the offloading point. According to an embodiment of the disclosure, when the server 110 is the entity determining the offloading point, the offloading point included in the response received from the server 110 in operation S1420 may be determined as a final offloading point.

The UE 100 may determine whether the offloading data is to be processed at operation S1450. More particularly, the UE 100 may determine whether the offloading data is to be processed based on the offloading point determined by the server 110. When the UE 100 determines the offloading point, the UE 100 may determine whether the offloading data is to be processed based on the determined offloading point.

The UE 100 may determine to terminate processing of the offloading data corresponding to the offloading point determined by the server 110 at operation S1460. In this case, the UE 100 may transmit, to the server 110, a request for termination of the processing of offloading data.

On the other hand, when the UE 100 determines that the offloading data is to be processed, the UE 100 may transmit information necessary for processing the offloading data to the server 110 at operation S1470. Furthermore, the UE 100 may receive a result of the processing of the offloading data from the server 110 at operation S1480.

Figure 15:
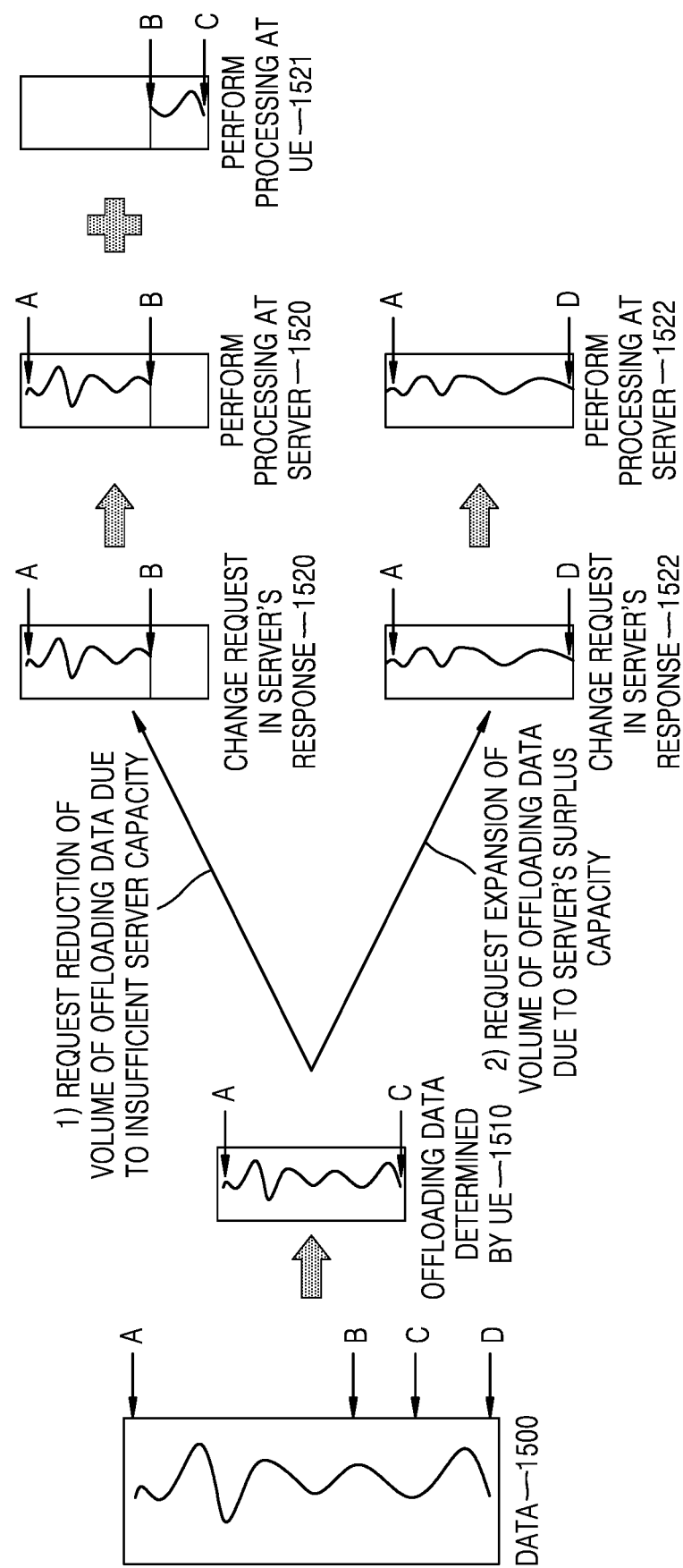
FIG. 15 is a diagram illustrating a method, performed by a server, of determining offloading data according to an embodiment of the disclosure.

FIG. 15 is a diagram illustrating a method, performed by the server 110, of determining offloading data according to an embodiment of the disclosure.

Referring to FIG. 15, the UE 100 may determine that at least a part of data 1500 is to be processed by the server 110. In other words, the UE 100 may determine the at least some of the data 1500 as offloading data 1510.

Referring to FIG. 15, the server 110 may analyze the data 1500 and determine splitting points at which the data 1500 are splittable as points A, B, C, and D. The UE 100 may determine offloading points as points A and C based on a list including points A, B, C, and D received from the server 110. Accordingly, the offloading data 1510 may be determined as data corresponding to point A to point C of the data 1500.

According to an embodiment of the disclosure, the server 110 may receive, from the UE 100, information about the offloading points A and C and information about requirements for the offloading data 1510. The server 110 may determine whether it is capable of processing the offloading data 1510 based on the received information.

When the server 110 is not capable of processing the offloading data 1510 determined by the UE 100 due to insufficient capacity of the server 110, the server 110 may include a change request for change to the offloading data 1510 in the response. While FIG. 15 shows an example in which the server 110 is not able to process the offloading data 1510 due to a lack of its capacity, the server 110 may also include a change request for change to the offloading data 1510 in the response when the server 110 is not able to satisfy the offloading point or requirements for any other reason. For example, the server 110 may include, in the response, a request for change to the offloading point to points A and B and transmit the response to the UE 100. When the server 110 is responsible for determining offloading data, the UE 100 may change the offloading data 1510 to data 1520 corresponding to point A to point B according to the change request from the server 110. Thus, the UE 100 may process data 1521 corresponding to point B to point C, except for the offloading data 1520 among the data 1500.

On the other hand, the server 110 may include, in the response, a request for expansion of a volume of the offloading data 1510 due to its surplus capacity for transmission to the UE 100. When the server 110 is an entity determining offloading data, offloading data 1522 to be processed by the server 110 may be determined according to a change request for change to the offloading data 1510, which is included in the response. In other words, according to the request for expansion of the volume of the offloading data 1510 from the server 110, the offloading data 1522 may be determined as data corresponding to point A to point D.

In this way, when the server 110 is responsible for determining offloading data, the UE 100 needs to accept the change request from the server 110. On the other hand, when the UE 100 is an entity determining offloading data, the UE 100 may change requirements or offloading data based on a change request from the server 110.

Figure 16:
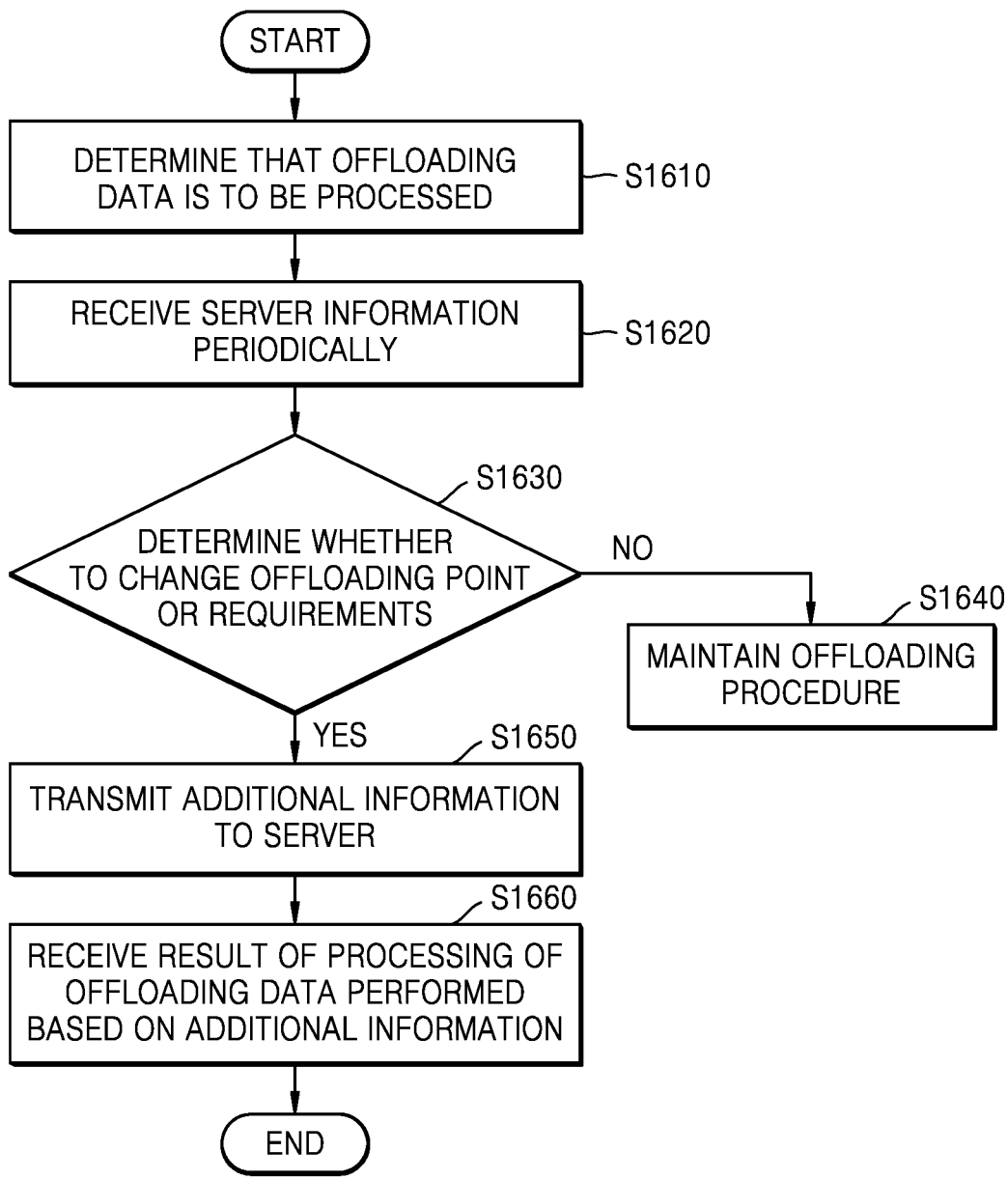
FIG. 16 is a flowchart of a method, performed by a UE, of changing offloading data or requirements while performing an offloading procedure according to an embodiment of the disclosure.

FIG. 16 is a flowchart of a method, performed by the UE 100, of changing offloading data or requirements while performing an offloading procedure according to an embodiment of the disclosure.

Descriptions that are already provided above with respect to FIGS. 1 to 5, 6A and 6B, and 7 to 15 will be omitted when describing the method of FIG. 16. For example, offloading data may be determined according to the operations described above with reference to FIGS. 1 to 5, 6A and 6B, 7 to 15.

Referring to FIG. 16, the UE 100 may determine that offloading data is to be processed at operation S1610. In other words, the UE 100 may transmit information necessary for processing the offloading data to the server 110 based on a response from the server 110.

The UE 100 may periodically receive server information at operation S1620. Furthermore, the UE 100 may aperiodically receive server information. In other words, the UE 100 may obtain information about real-time changing status of the server 110 or channel conditions based on the received server information.

The UE 100 may determine whether to change an offloading point or requirements based on the received server information at operation S1630. When the UE 100 determines not to change the offloading point or requirements, it may maintain an existing offloading procedure at operation S1640.

On the other hand, when the UE 100 determines to change the offloading point or requirements, it may transmit additional information to the server 110 at operation S1650. The additional information may include information related to a change to the offloading point or requirements. More particularly, the UE 100 may transmit, to the server 110, a request for reduction or expansion of a volume of the offloading data, or information for downgrading or upgrading the requirements.

The UE 100 may receive a result of processing of the offloading data, which is performed based on the additional information at operation S1660. More particularly, the server 110 may transmit, to the UE 100, a response as to whether to accept the changed requirements based on the additional information. In a case where the server 110 transmits an indicator indicating acceptance of the changed requirements to the UE 100, when there is no change in the offloading point, the server 110 may perform processing of the offloading data based on the previously received information necessary for processing the offloading data. On the other hand, when a volume of the offloading data is expanded, the server 110 may additionally receive only information necessary for processing the expanded volume of offloading data. In other words, even when the volume of the offloading data is reduced or the requirements are downgraded, the server 110 may process the offloading data based on the previously received information.

Figure 17:
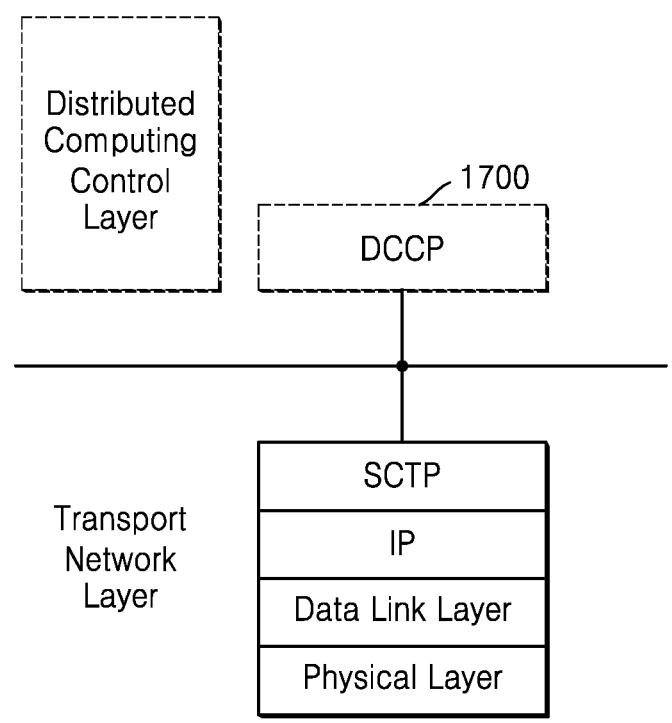
FIG. 17 is a diagram for illustrating a distributed computing control protocol (DCCP) according to an embodiment of the disclosure.

FIG. 17 is a diagram illustrating a distributed computing control protocol (DCCP) 1700 according to an embodiment of the disclosure.

Referring to FIG. 17, the DCCP 1700 refers to a protocol for supporting a procedure of dynamic offloading between the UE 100 and the server 110 by exchanging control information using a stream control transmission protocol (SCTP) port.

The DCCP 1700 may be a distributed computing protocol similar to S1 application protocol (S1-AP). Referring to FIG. 17, the DCCP 1700 may reside in a distributed computing control layer. Furthermore, to support an offloading procedure, the DCCP 1700 may control setup, modification, or release of a connection between the UE 100 and the server 110. In addition, the DCCP 1700 may control operations for determining offloading data between the UE 100 and the server 110, performing offloading, and indicating capability information for offloading. In other words, the DCCP 1700 may control information necessary for offloading data to be included in a message.

Figure 18:
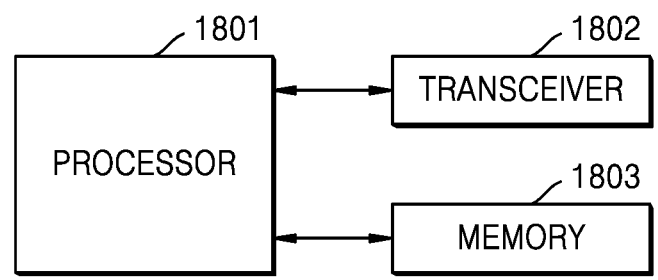
FIG. 18 illustrates an internal structure of a UE according to an embodiment of the disclosure.

FIG. 18 illustrates an internal structure of the UE 100 according to an embodiment of the disclosure.

Referring to FIG. 18, according to an embodiment of the disclosure, the UE 100 may include a processor 1801, a transceiver 1802, and a memory 1803. The processor 1801, the transceiver 1802, and the memory 1803 of the UE 100 may operate according to the above-described method of performing communication by the UE 100. The components of the UE 100 are not limited to the above-described example. For example, the UE 100 may include more or fewer components than those described above. Furthermore, the processor 1801, the transceiver 1802, and the memory 1803 may be implemented as a single chip.

The transceiver 1802 collectively denotes a receiver and a transmitter of the UE 100 and may transmit or receive a signal to or from the server 110 via a network. The signal transmitted or received via the network may include control information and data. For this purpose, the transceiver 1802 may include a radio frequency (RF) transmitter for up-converting and amplifying a frequency of a signal to be transmitted and an RF receiver for low-noise amplifying a received signal and down-converting its frequency. However, this is merely an example of the transceiver 1802, and the components of the transceiver 1802 are not limited to the RF receiver and the RF transmitter.

Furthermore, the transceiver 1802 may receive a signal via a radio channel and output the signal to the processor 1801 and transmit a signal output from the processor 1801 via a radio channel.

The memory 1803 may store data and programs necessary for operations of the UE 100. Furthermore, the memory 1803 may store control information or data in a signal transmitted or received by the UE 100. The memory 1803 may be including storage media, such as read-only memory (ROM), random access memory (RAM), hard discs, compact disc (CD)-ROM, and digital video discs (DVDs), or a combination thereof.

The processor 1801 may include at least one processor. For example, the processor 1801 may include a communication processor (CP) for performing control for communication and an application processor (AP) for controlling an upper layer, such as an application program. The processor 1801 may control a series of processes such that the UE 100 may operate according to the above embodiments of the disclosure.

More particularly, the processor 1801 may determine the server 110 for processing at least a part of data. The processor 1801 may receive a list regarding splitting points at which the data is splittable from the server 110 via the transceiver 1802. The processor 1801 may determine at least one of the splitting points as an offloading point, based on the received list. Furthermore, the processor 1801 may transmit information about the offloading point and information about requirements for offloading data corresponding to the offloading point to the server 110 via the transceiver 1802. In addition, the processor 1801 may receive a response as to whether the offloading data is capable of being processed from the server 110 via the transceiver 1802 and determine whether the offloading data is to be processed based on the received response.

Figure 19:
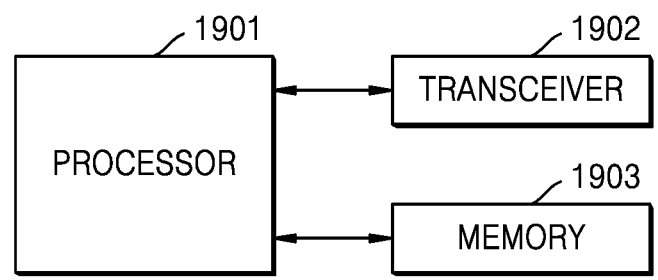
FIG. 19 illustrates an internal structure of a server according to an embodiment of the disclosure.

FIG. 19 illustrates an internal structure of the server 110 according to an embodiment of the disclosure.

Referring to FIG. 19, according to an embodiment of the disclosure, the server 110 may include a processor 1901, a transceiver 1902, and a memory 1903. The processor 1901, the transceiver 1902, and the memory 1903 of the server 110 may operate according to the above-described method of performing communication by the server 110. The components of the server 110 are not limited to the above-described example. For example, the server 110 may include more or fewer components than those described above. Furthermore, the processor 1901, the transceiver 1902, and the memory 1903 may be implemented as a single chip.

The transceiver 1902 collectively denotes a receiver and a transmitter of the server 110 and may transmit or receive a signal to or from the UE 100 via a network. The signal transmitted or received via the network may include control information and data. For this purpose, the transceiver 1902 may include an RF transmitter for up-converting and amplifying a frequency of a signal to be transmitted and an RF receiver for low-noise amplifying a received signal and down-converting its frequency. However, this is merely an example of the transceiver 1902, and the components of the transceiver 1902 are not limited to the RF receiver and the RF transmitter.

Furthermore, the transceiver 1902 may receive a signal via a radio channel and output the signal to the processor 1901 and transmit a signal output from the processor 1901 via a radio channel.

The memory 1903 may store data and programs necessary for operations of the server 110. Furthermore, the memory 1903 may store control information or data in a signal obtained by the server 110. The memory 1903 may be including storage media, such as ROM, RAM, hard discs, CD-ROM, and DVDs, or a combination thereof.

The memory 1903 may store data and information received from the UE 100. Furthermore, when receiving a data retention request indicator from the UE 100, the server 110 may store the previously transmitted data in order to resume an offloading procedure according to control by the processor 1901.

The processor 1901 may include at least one processor. For example, the processor 1901 may include a CP for performing control for communication and an AP for controlling an upper layer, such as an application program. The processor 1901 may control a series of processes such that the server 110 may operate according to the above embodiments of the disclosure.

More particularly, the processor 1901 may determine splitting points at which data received from the UE 100 is splittable and transmit a list regarding the determined splitting points to the UE 100 via the transceiver 1902. The processor 1901 may control the transceiver 1902 to receive information about a determined offloading point and information about requirements for offloading data corresponding to the offloading point, transmit a response as to whether the server 110 is capable of processing the offloading data, and receive a result of determining whether the offloading data is to be processed based on the response.

Some embodiments of the disclosure may be implemented through computer-readable recording media having recorded thereon computer-executable instructions, such as program modules that are executed by a computer. The computer-readable recording media may be any available media that can be accessed by a computer and include both volatile and nonvolatile media and both detachable and non-detachable media. Furthermore, the computer-readable recording media may include computer storage media. The computer storage media include both volatile and nonvolatile and both detachable and non-detachable media implemented by any method or technique for storing information, such as computer-readable instructions, data structures, program modules, or other data.

While particular embodiments of the disclosure have been described with reference to the figures, it will be understood by those of ordinary skill in the art that various changes and modifications in form and details may be made therein without departing from the spirit and scope of the disclosure as defined by the following claims.

Methods of offloading data in a wireless communication system according to some embodiments of the disclosure may be implemented in the form of program instructions that may be performed by various types of computers and may be recorded on computer-readable recording media. The computer-readable recording media may include program instructions, data files, data structures, or the like, either alone or in combination. The program instructions recorded on the computer-readable recording media may be designed and configured specially for the disclosure or may be known to and be usable by those skilled in the art of computer software. The computer-readable recording media may be included in a computer program product.

Examples of the computer-readable recording media include magnetic media, such as hard disks, floppy disks, and magnetic tape, optical media, such as CD-ROM and DVDs, magneto-optical media, such as floptical disks, and hardware devices that are specially configured to store and perform program instructions, such as ROM, RAM, flash memory, or the like. Examples of program instructions include not only machine code, such as that created by a compiler but also higher level language code executable by a computer using an interpreter or the like.

The computer-readable storage medium may be provided in the form of a non-transitory storage medium. In this regard, the term 'non-transitory' only means that the storage medium does not refer to a transitory electrical signal and is tangible, and the term does not distinguish between data that is semi-permanently stored and data that is temporarily stored in the storage medium. For example, the 'non-transitory storage medium' may include a buffer in which data is temporarily stored.

According to an embodiment of the disclosure, methods according to various embodiments of the disclosure may be included in a computer program product when provided. The computer program product may be traded, as a product, between a seller and a buyer. For example, the computer program product may be distributed in the form of a device-readable storage medium (e.g., CD-ROM) or distributed (e.g., downloaded or uploaded) on-line via an application store (e.g., Google™, Play Store™) or directly between two user devices (e.g., smartphones). For online distribution, at least a part of the computer program product (e.g., a downloadable app) may be at least transiently stored or temporally created on a device-readable storage medium, such as a server of a manufacturer, a server of an application store, or a memory of a relay server.

Furthermore, in the specification, the term "unit" may be a hardware component, such as a processor or circuit and/or a software component that is executed by a hardware component, such as a processor.

A method and an apparatus for offloading data in a wireless communication system according to embodiments of the disclosure may provide services that comply with requirements.

Furthermore, the method and apparatus for offloading data in a wireless communication system according to the embodiments of the disclosure may increase data processing efficiency by changing offloading data according to a server status or channel conditions.

The above description of the disclosure is provided for illustration, and it will be understood by those of ordinary skill in the art that various changes in form and details may be readily made therein without departing from essential features and the spirit and scope of the disclosure as defined by the following claims. Thus, the above embodiments of the disclosure and all aspects thereof are examples only and are not limiting. For example, each component defined as an integrated component may be implemented in a distributed fashion. Likewise, components defined as separate components may be implemented in an integrated manner.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method, performed by a user equipment (UE), of offloading data, the method comprising:
    determining a server for processing at least some of the data;
    receiving a list regarding splitting points at which the data is splittable from the server;
    determining, based on the list, at least one of the splitting points as an offloading point;
    transmitting, to the server, information about the offloading point and information about requirements for offloading data corresponding to the offloading point;
    receiving, from the server, a response as to whether the offloading data is capable of being processed; and
    determining whether the offloading data is to be processed, based on the response,
    wherein the response as to whether the offloading data is capable of being processed comprises change request information when the offloading data is not capable of being processed to satisfy the requirements and the requirements are not mandatory requirements, and
    wherein the change request information comprises information related to a request for a change to the offloading point and a request for a change to the requirements.

2. The method of claim 1, wherein the information about the requirements comprises at least one of quality of service (QoS) information, latency information, processing time information, or capacity information that needs to be satisfied when the offloading data is processed by the server.

3. The method of claim 1, wherein the response as to whether the offloading data is capable of being processed comprises:
    when the offloading data is capable of being processed to satisfy the requirements, an acknowledgement (ACK); and
    when the offloading data is not capable of being processed to satisfy the requirements, a negative-ACK (NACK).

4. The method of claim 3, further comprising:
    estimating a time required for the server to process the offloading data, wherein the requirements include a condition that a time calculated by the server as a time required to process the offloading data is less than the estimated time.

5. The method of claim 3, wherein the determining of whether the offloading data is to be processed comprises:
    when the response as to whether the offloading data is capable of being processed includes the ACK, transmitting, to the server, information necessary for processing the offloading data; and
    receiving, from the server, a result of processing the offloading data.

6. The method of claim 3, wherein the determining of whether the offloading data is to be processed comprises, when the response as to whether the offloading data is capable of being processed includes the NACK, requesting the server to terminate processing of the offloading data.

7. The method of claim 3, wherein the determining of whether the offloading data is to be processed comprises:
    when the response as to whether the offloading data is capable of being processed includes the change request information, changing the offloading point or the requirements, based on the change request information;
    transmitting, to the server, information necessary for processing offloading data changed based on a result of the changing; and
    receiving, from the server, a result of processing the changed offloading data.

8. The method of claim 1,
    wherein the data includes training data for machine learning, and
    wherein the offloading data is data trained by the server among the training data.

9. The method of claim 1, wherein the determining of the server comprises:
    receiving server information from at least one server; and
    determining, based on the received server information, the server for processing the at least some of the data from among the at least one server.

10. The method of claim 1, wherein the determining of whether the offloading data is to be processed comprises:
    determining that the offloading data is to be processed by the server;
    changing the offloading point and the requirements while the offloading data is being processed by the server;
    transmitting information about the changed offloading point and requirements to the server; and
    receiving, from the server, a result of processing the offloading data based on the information about the changed offloading point and requirements.

11. A method, performed by a server, of processing offloading data, the method comprising:
    determining splitting points at which data received from a user equipment (UE) is splittable;
    transmitting a list regarding the determined splitting points to the UE;
    receiving, from the UE, information about an offloading point determined based on the list and information about requirements for offloading data corresponding to the offloading point;
    transmitting, to the UE, a response as to whether the server is capable of processing the offloading data; and
    receiving, from the UE, a result of determining whether the offloading data is to be processed based on the response,
    wherein the response as to whether the offloading data is capable of being processed comprises change request information when the offloading data is not capable of being processed to satisfy the requirements and the requirements are not mandatory requirements, and wherein the change request information comprises information related to a request for a change to the offloading point and a request for a change to the requirements.

12. The method of claim 11, wherein the response as to whether the server is capable of processing the offloading data comprises:
when the server is capable of processing the offloading data so as to satisfy the requirements, an acknowledgement (ACK); and
when the server is not capable of processing the offloading data so as to satisfy the requirements, a negative-ACK (NACK).

13. A user equipment (UE) for offloading data, the UE comprising:
a memory;
a transceiver; and
at least one processor configured to:
determine a server for processing at least some of the data,
receive, from the server, a list regarding splitting points at which the data is splittable,
determine, based on the list, at least one of the splitting points as an offloading point,
transmit, to the server, information about the offloading point and information about requirements for offloading data corresponding to the offloading point,
receive a response as to whether the offloading data is capable of being processed from the server, and
determine whether the offloading data is to be processed, based on the response,
wherein the response as to whether the offloading data is capable of being processed comprises change request information when the offloading data is not capable of being processed to satisfy the requirements and the requirements are not mandatory requirements, and
wherein the change request information comprises information related to a request for a change to the offloading point and a request for a change to the requirements.

14. The UE of claim 13, wherein the information about the requirements comprises at least one of quality of service (QoS) information, latency information, processing time information, or capacity information that needs to be satisfied when processing the offloading data.

15. The UE of claim 13, wherein the response as to whether the offloading data is capable of being processed comprises:
when the offloading data is capable of being processed to satisfy the requirements, an acknowledgement (ACK); and
when the offloading data is not capable of being processed to satisfy the requirements, a negative-ACK (NACK).

16. The UE of claim 15,
wherein the at least one processor is further configured to estimate a time required for the server to process the offloading data, and
wherein the requirements include a condition that a time calculated by the server as a time required to process the offloading data is shorter than the estimated time.

17. The UE of claim 15, wherein the at least one processor is further configured to:
when the response as to whether the offloading data is capable of being processed includes the ACK, transmit information necessary for processing the offloading data to the server, and
receive a result of processing the offloading data from the server.

18. The UE of claim 15, wherein the at least one processor is further configured to, when the response as to whether the offloading data is capable of being processed includes the NACK, request the server to terminate processing of the offloading data.

19. A server for processing offloading data, the server comprising:
a memory;
a transceiver; and
at least one processor configured to:
determine splitting points at which data received from a user equipment (UE) is splittable,
transmit, to the UE, a list regarding the determined splitting points,
receive, from the UE, information about an offloading point determined based on the list and information about requirements for offloading data corresponding to the offloading point,
transmit, to the UE, a response as to whether the server is capable of processing the offloading data, and
receive, from the UE, a result of determining whether the offloading data is to be processed, based on the response,
wherein the response as to whether the offloading data is capable of being processed comprises change request information when the offloading data is not capable of being processed to satisfy the requirements and the requirements are not mandatory requirements, and
wherein the change request information comprises information related to a request for a change to the offloading point and a request for a change to the requirements.

* * * * *